US006598074B1

(12) United States Patent
Moller et al.

(10) Patent No.: US 6,598,074 B1
(45) Date of Patent: Jul. 22, 2003

(54) SYSTEM AND METHOD FOR ENABLING MULTIMEDIA PRODUCTION COLLABORATION OVER A NETWORK

(75) Inventors: Matthew D. Moller, San Francisco, CA (US); Graham Lyus, Bexley (GB); Michael Franke, San Francisco, CA (US)

(73) Assignee: Rocket Network, Inc., San Francisco, CA (US)

( * ) Notice: Subject to any disclaimer, the term of this patent is extended or adjusted under 35 U.S.C. 154(b) by 0 days.

(21) Appl. No.: 09/401,318

(22) Filed: Sep. 23, 1999

(51) Int. Cl.[7] .......................... G06F 15/16; H04L 12/16

(52) U.S. Cl. ....................... 709/204; 709/205; 709/219; 370/260; 370/263

(58) Field of Search ................................ 709/204, 205, 709/219, 231, 206, 217, 218; 370/260, 263, 270; 725/61, 87, 133

(56) References Cited

U.S. PATENT DOCUMENTS

| | | | | | |
|---|---|---|---|---|---|
| 5,617,539 | A | * | 4/1997 | Ludwig et al. | 395/200.02 |
| 5,805,821 | A | * | 9/1998 | Saxena et al. | 709/231 |
| 5,811,706 | A | * | 9/1998 | Van Buskirk et al. | 84/604 |
| 5,880,788 | A | * | 3/1999 | Bregler | 348/515 |
| 5,886,274 | A | * | 3/1999 | Jungleib | 84/601 |
| 5,926,205 | A | * | 7/1999 | Krause et al. | 725/103 |
| 5,952,599 | A | | 9/1999 | Dolby et al. | |
| 5,995,491 | A | * | 11/1999 | Richter et al. | 370/263 |
| 6,014,694 | A | * | 1/2000 | Aharoni et al. | 709/219 |
| 6,061,717 | A | * | 5/2000 | Carleton et al. | 709/205 |
| 6,105,055 | A | * | 8/2000 | Pizano et al. | 709/204 |
| 6,154,600 | A | * | 11/2000 | Newman et al. | 386/4 |
| 6,243,676 | B1 | * | 6/2001 | Witteman | 704/243 |
| 6,269,394 | B1 | * | 7/2001 | Kenner et al. | 709/217 |
| 6,295,058 | B1 | * | 9/2001 | Hsu et al. | 707/500.1 |
| 6,320,600 | B1 | * | 11/2001 | Smith et al. | 345/723 |
| 6,351,471 | B1 | * | 2/2002 | Robinett et al. | 370/468 |
| 6,438,611 | B1 | * | 8/2002 | Hara et al. | 709/248 |

FOREIGN PATENT DOCUMENTS

| | | |
|---|---|---|
| EP | 0933 906 A2 | 4/1999 |
| WO | WO 94 11358 A | 5/1994 |

OTHER PUBLICATIONS

Selected web pages from "Blue Mountain Greeting Cards," www.bluemountain.com. Dec. 10, 1997.*

Selected web pages from "EGREETINGS," www.egreetings.com, Dec. 21, 1996.*

Selected web pages from "MessageMates," www.messagemates.com, Jan. 25, 1999.*

* cited by examiner

*Primary Examiner*—Robert B. Harrell
*Assistant Examiner*—Melvin H. Pollack
(74) *Attorney, Agent, or Firm*—Finnegan, Henderson, Farabow, Garrett & Dunner, L.L.P.

(57) ABSTRACT

A system and method for collaborative multimedia production by users at different geographic locations. The users produce sequencer data at a plurality of sequencer stations connected via a network. The sequencer stations encapsulate sequencer data units into broadcast data units and upload and download broadcast data units to and from a server, in response to user commands received at the sequencer stations.

36 Claims, 11 Drawing Sheets

SYSTEM AND METHOD FOR ENABLING MULTIMEDIA PRODUCTION COLLABORATION OVER A NETWORK

BACKGROUND OF THE INVENTION

Field of the Invention

The invention relates to data sharing and, more particularly, to sharing of multimedia data over a network.

Computer technology is increasingly incorporated by musicians and multimedia production specialists to aide in the creative process. For example, musicians use computers configured as "sequencers" or "DAWs" (digital audio workstations) to record multimedia source material, such as digital audio, digital video, and Musical Instrument Digital Interface (MIDI) data. Sequences and DAWs then create sequence data to enable the user to select and edit various portions of the recorded data to produce a finished product.

Sequencer software is often used when multiple artists collaborate in a project usually in the form of multitrack recordings of individual instruments gathered together in a recording studio. A production specialist then uses the sequencer software to edit the various tracks, both individually and in groups, to produce the final arrangement for the product. Often in a recording session, multiple "takes" of the same portion of music will be recorded, enabling the production specialist to select the best portions of various takes. Additional takes can be made during the session if necessary.

Such collaboration is, of course, most convenient when all artists are present in the same location at the same time. However, this is often not possible. For example, an orchestra can be assembled at a recording studio in Los Angeles but the vocalist may be in New York or London and thus unable to participate in person in the session. It is, of course, possible for the vocalist to participate from a remote studio linked to the main studio in Los Angeles by wide bandwidth, high fidelity communications channels. However, this is often prohibitively expensive, if not impossible.

Various methods of overcoming this problem are known in the prior art. For example, the Res Rocket system of Rocket Networks, Inc. provides the ability for geographically separated users to share MIDI data over the Internet. However, professional multimedia production specialists commonly use a small number of widely known professional sequencer software packages. Since they have extensive experience in using the interface of a particular software package, they are often unwilling to forego the benefits of such experience to adopt an unfamiliar sequencer.

It is therefore desirable to provide a system and method for professional artists and multimedia production specialists to collaborate from geographically separated locations using familiar user interfaces of existing sequencer software.

SUMMARY OF THE INVENTION

Features and advantages of the invention will be set forth in the description which follows, and in part will be apparent from the description, or may be learned by practice of the invention. The objectives and other advantages of the invention will be realized and attained by the systems and methods particularly pointed out in the written description and claims hereof, as well as the appended drawings.

In accordance with the purpose of the invention as embodied and broadly described, the invention includes apparatus for sharing sequence data between a local sequencer station and at least one remote sequencer station over a network via a server, the sequence data representing audiovisual occurrences each having descriptive characteristics and time characteristics. The apparatus includes a first interface module receiving commands from a local sequencer station and a data packaging module coupled to the first interface module. The data packaging module responds to the received commands by encapsulating sequence data from the local sequencer station into broadcast data units retaining the descriptive characteristics and time relationships of the sequence data. The data packaging module also extracts sequence data from broadcast data units received from the server for access by the local sequencer terminal. The apparatus further includes a broadcast handler coupled to the first interface module and the data packaging module. The broadcast handler to processes commands received via the first interface module. The apparatus also includes a server communications module responding to commands processed by the broadcast handler by transmitting broadcast data units to the server for distribution to at least one remote sequencer station, the server communications module also receiving data available messages and broadcast data units from the server. The apparatus further includes a notification queue handler coupled to the server communications module and responsive to receipt of data available messages and broadcast data units from the server to transmit notifications to the first interface for access by the local sequencer terminal.

In another aspect the invention provides a method for sharing sequence data between a local sequencer station and at least one remote sequencer station over a network via a server, the sequence data representing audiovisual occurrences each having descriptive characteristics and time characteristics. The method includes receiving commands via a client application component from a user at a local sequencer station; responding to the received commands by encapsulating sequence data from the local sequencer station into broadcast data units retaining the descriptive characteristics and time relationships of the sequence data and transmitting broadcast data units to the server for distribution to at least one remote sequencer station; receiving data available messages from the server; responding to receipt of data available messages from the server to transmit notifications to the client application component; responding to commands received from the client application component to request download of broadcast data units from the server; and receiving broadcast data units from the server and extracting sequence data from the received broadcast data units for access by the client application component.

It is to be understood that both the foregoing general description and the following detailed description are exemplarily and explanatory and are intended to provide further explanation of the invention as claimed.

The accompanying drawings are included to provide a further understanding of the invention and are incorporated in and constitute a part of this specification to illustrate embodiments of the invention and, together with the description, serve to explain the principles of the invention.

BRIEF DESCRIPTION OF THE DRAWINGS

The accompanying drawings which are incorporated in and constitute a part of this specification illustrate embodiments of the invention and together with the description serve to explain the objects advantages and principles of the invention.

In the drawings.

DETAILED DESCRIPTION OF THE PREFERRED EMBODIMENTS

Computer applications for musicians and multimedia production specialists (typically sequencers and DAWs) are built to allow users to record and edit multimedia data to create a multimedia project. Such applications are inherently single-purpose, single-user applications. The present invention enables geographically separated persons operating individual sequencers and DAWs to collaborate.

The basic paradigm of the present invention is that of a "virtual studio." This, like a real-world studio, is a "place" for people to "meet" and work on multimedia projects together. However, the people that an individual user works with in this virtual studio can be anywhere in the world—connected by a computer network.

Figure 1:
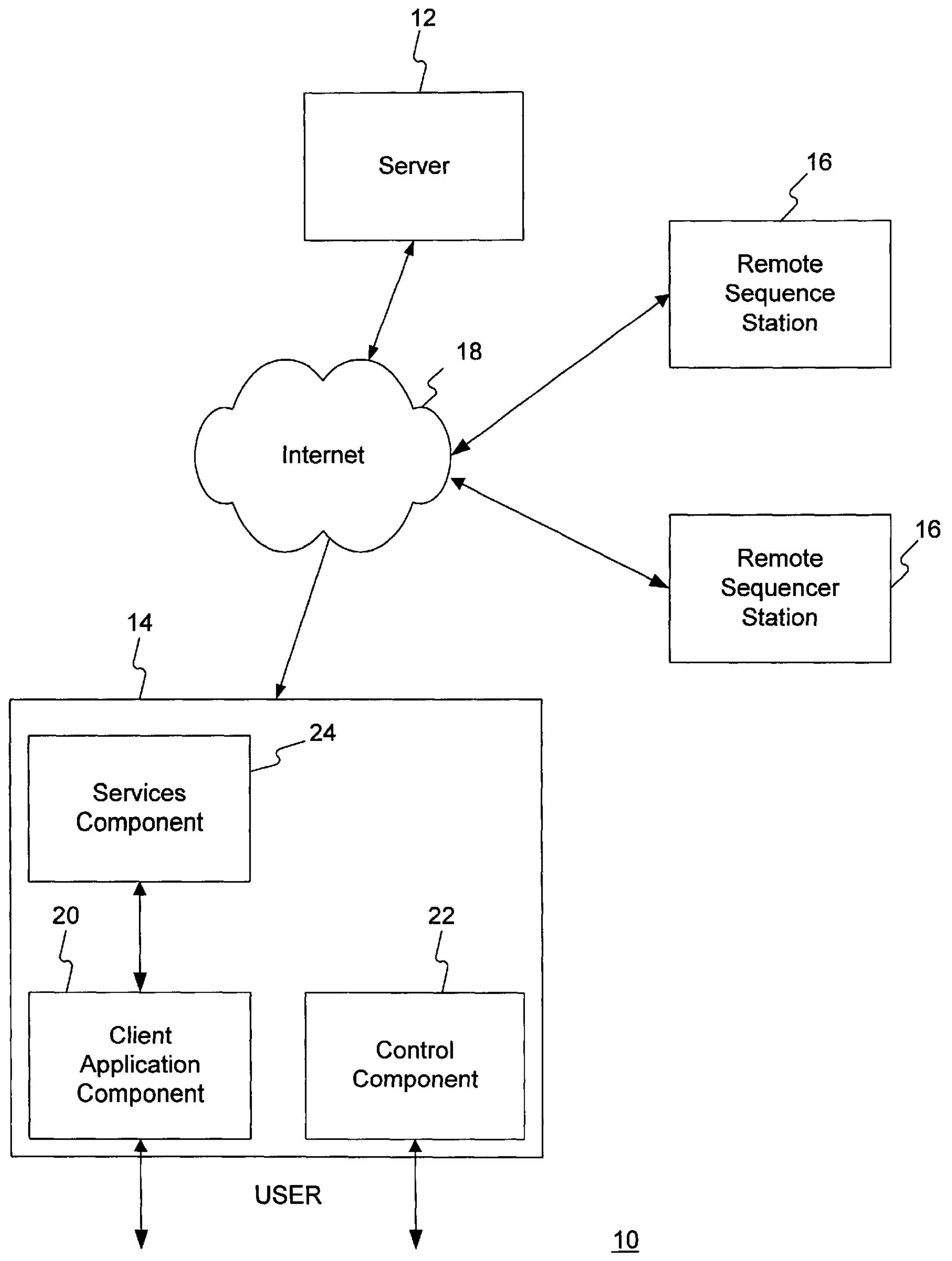
FIG. 1 is a block diagram showing system consistent with a preferred embodiment of the present invention.

FIG. 1 shows a system 10 consistent with the present invention. System 10 includes a server 12, a local sequencer station 14, and a plurality of remote sequencer stations 16, all interconnected via a network 18. Network 18 may be the Internet or may be a proprietary network.

Local and remote sequencer stations 14 and 16 are preferably personal computers, such as Apple PowerMacintoshes or Pentium-based personal computers running a version of the Windows operating system. Local and remote sequencer stations 14 and 16 include a client application component 20 preferably comprising a sequencer software package, or "sequencer." As noted above, sequencers create sequence data representing multimedia data which in turn represents audiovisual occurrences each having descriptive characteristics and time characteristics. Sequencers further enable a user to manipulate and edit the sequence data to generate multimedia products. Examples of appropriate sequencers include Logic Audio from Emagic Inc. of Grass Valley, Calif.; Cubase from Steinberg Soft- und Hardware GmbH of Hamburg, Germany; and ProTools from Digidesign, Inc. of Palo Alto, Calif.

Local sequencer station 14 and remote sequencer stations 16 may be, but are not required to be, identical, and typically include display hardware such as a CRT and sound card (not shown) to provide audio and video output.

Local sequencer station 14 also includes a connection control component 22 which allows a user at local sequencer station 14 to "log in" to server 12, navigate to a virtual studio, find other collaborators at remote sequencer stations 16, and communicate with those collaborators. Each client application component 20 at local 15 and remote sequencer stations 14 and 16 is able to load a project stored in the virtual studio, much as if it were created by the client application component at that station—but with some important differences.

Client application components 20 typically provide an "arrangement" window on a display screen containing a plurality of "tracks," each displaying a track name, record status, channel assignment, and other similar information. Consistent with the present invention, the arrangement window also displays a new item: user name. The user name is the name of the individual that "owns" that particular track, after creating it on his local sequencer station. This novel concept indicates that there is more than one person contributing to the current session in view. Tracks are preferably sorted and color-coded in the arrangement window, according to user.

Connection control component 22 is also visible on the local user's display screen, providing (among other things) two windows: incoming chat and outgoing chat. The local user can see text scrolling by from other users at remote sequencer stations 16, and the local user at local sequencer station 14 is able to type messages to the other users.

In response to a command from a remote user, a new track may appear on the local user's screen, and specific musical parts begin to appear in it. If the local user clicks "play" on his display screen, music comes through speakers at the local sequencer station. In other words, while the local user has been working on his tracks, other remote users have been making their own contributions.

As the local user works, he "chats" with other users via connection control component 22, and receives remote users' changes to their tracks as they broadcast, or "post," them. The local user can also share his efforts, by recording new material and making changes. When ready, the local user clicks a "Post" button of client application component 20 on his display screen, and all remote users in the virtual studio can hear what the local user is hearing—live.

As shown in FIG. 1, local sequencer station 14 also includes a services component 24 which provides services to enable local sequencer station 14 to share sequence data with remote sequencer stations 16 over network 18 via server 12, including server communications and local data management. This sharing is accomplished by encapsulating units of sequence data into broadcast data units for transmission to server 12.

Although server 12 is shown and discussed herein as a single server, those skilled in the art will recognize that the server functions described may be performed by one or more individual servers. For example, it may be desirable in certain applications to provide one server responsible for management of broadcast data units and a separate server responsible for other server functions, such as permissions management and chat administration.

Figure 2:
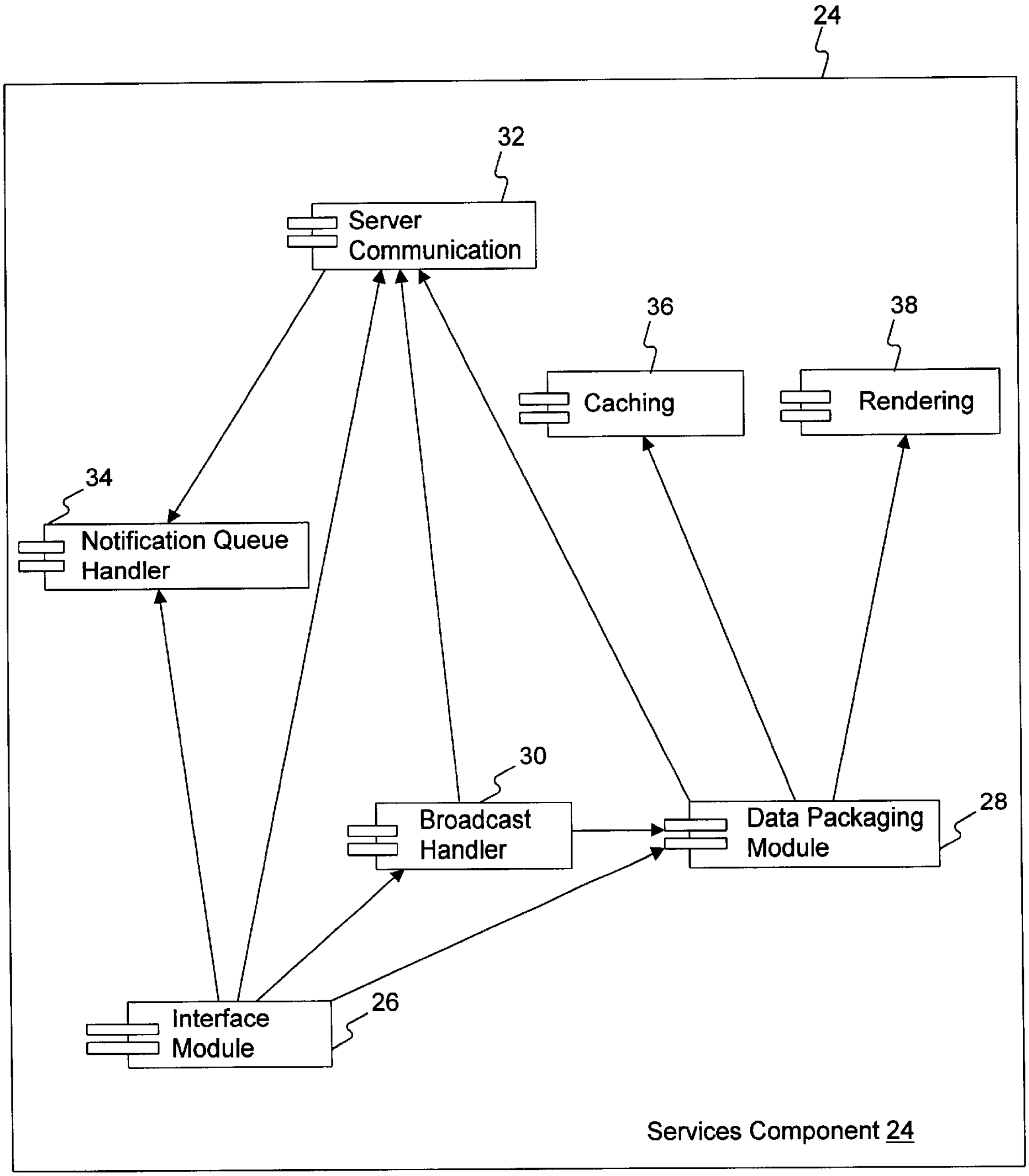
FIG. 2 is a block diagram showing modules of the services component of FIG. 1.

FIG. 2 shows the subsystems of services component 24, including first interface module 26, a data packaging module 28, a broadcast handler 30, a server communications module 32, and a notification queue handler 34. Services component 24 also includes a rendering module 36 and a caching module 38. Of these subsystems, only first interface module 26 is accessible to software of client application component 20. First interface module 26 receives commands from client application component 20 of local sequencer station 14 and passes them to broadcast handler 30 and to data packaging module 28. Data packaging module 28 responds to the received commands by encapsulating sequence data from local sequencer station 14 into broadcast data units retaining the descriptive characteristics and time relationships of the sequence data. Data packaging module 28 also extracts sequence data from broadcast data units received from server 12 for access by client application component 20.

Server communications module 32 responds to commands processed by the broadcast handler by transmitting broadcast data units to server 12 for distribution to at least one remote sequencer station 16. Server communications module 32 also receives data available messages from server 12 and broadcast data units via server 12 from one or more remote sequencer stations 16 and passes the received broadcast data units to data packaging module 28. In particular, server communications module receives data available messages from server 12 that a broadcast data unit (from remote sequencer stations 16) is available at the server. If the available broadcast data unit is of a non-media type, discussed in detail below, server communications module requests that the broadcast data unit be downloaded from server 12. If the available broadcast data unit is of a media type, server communications module requests that the broadcast data unit be downloaded from server 12 only after receipt of a download command from client application component 20.

Notification queue handler 34 is coupled to server communications module 32 and responds to receipt of data available messages from server 12 by transmitting notifications to first interface module 26 for access by client application component 20 of local sequencer terminal 14.

Typically, a user at, for example, local sequencer station 14 will begin a project by recording multimedia data. This may be accomplished through use of a microphone and video camera to record audio and/or visual performances in the form of source digital audio data and source digital audio data stored on mass memory of local sequencer station 14. Alternatively, source data may be recorded by playing a MIDI instrument coupled to local sequencer station 14 and storing the performance in the form of MIDI data. Other types of multimedia data may be recorded.

Once the data is recorded, it can be represented in an "arrangement" window on the display screen of local sequencer station 14 by client application component 20, typically a sequencer program. In a well known manner, the user can select and combine multiple recorded tracks either in their entirety or in portions, to generate an arrangement. Client application component 20 thus represents this arrangement in the form of sequence data which retains the time characteristics and descriptive characteristics of the recorded source data.

When the user desires to collaborate with other users at remote sequencer stations 16, he accesses connection control component 22. The user provides commands to connection control component 22 to execute a log-in procedure in which connection control component 22 establishes a connection via services component 24 through the Internet 18 to server 12. Using well known techniques of log-in registration via passwords, the user can either log in to an existing virtual studio on server 12 or establish a new virtual studio. Virtual studios on server 12 contain broadcast data units generated by sequencer stations in the form of projects containing arrangements, as set forth in detail below.

A method consistent with the present invention will now be described. The method provides sharing of sequence data between local sequencer station 14 and at least one remote sequencer station 16 over network 18 via server 12. As noted above, the sequence data represents audiovisual occurrences each having a descriptive characteristics and time characteristics.

When the user desires to contribute sequence data generated on his sequence station to either a new or existing virtual studio, the user activates a POST button on his screen which causes client application component 20 to send commands to service component 24. A method consistent with the present invention includes receiving commands at services component 24 via client application component 20 from a user at local sequencer station 14. Broadcast handler 30 of service component 24 responds to the received commands by encapsulating sequence data from local sequencer station 14 into broadcast data units retaining the descriptive characteristics and time relationships of the sequence data. Broadcast handler 30 processes received commands by transmitting broadcast data units to server 12 via server communications module 32 for distribution to remote sequencer stations 16. Server communication module 32 receives data available messages from server 12 and transmits notifications to the client application component 20. Server communication module 32 responds to commands received from client application component 20 to request download of broadcast data units from the server 12. Server communication module 32 receives broadcast data units via the server from the at least one remote sequencer station. Data packaging module 28 then extracts sequence data from broadcast data units received from server 12 for access by client application component 20.

When a user is working on a project in a virtual studio, he is actually manipulating sets of broadcast data managed and persisted by server 12. In the preferred embodiment, services component 24 uses an object-oriented data model managed and manipulated by data packaging module 28 to represent the broadcast data. By using broadcast data units in the form of objects created by services component 24 from sequence data, users can define a hierarchy and map interdependencies of sequence data in the project.

Figure 3:
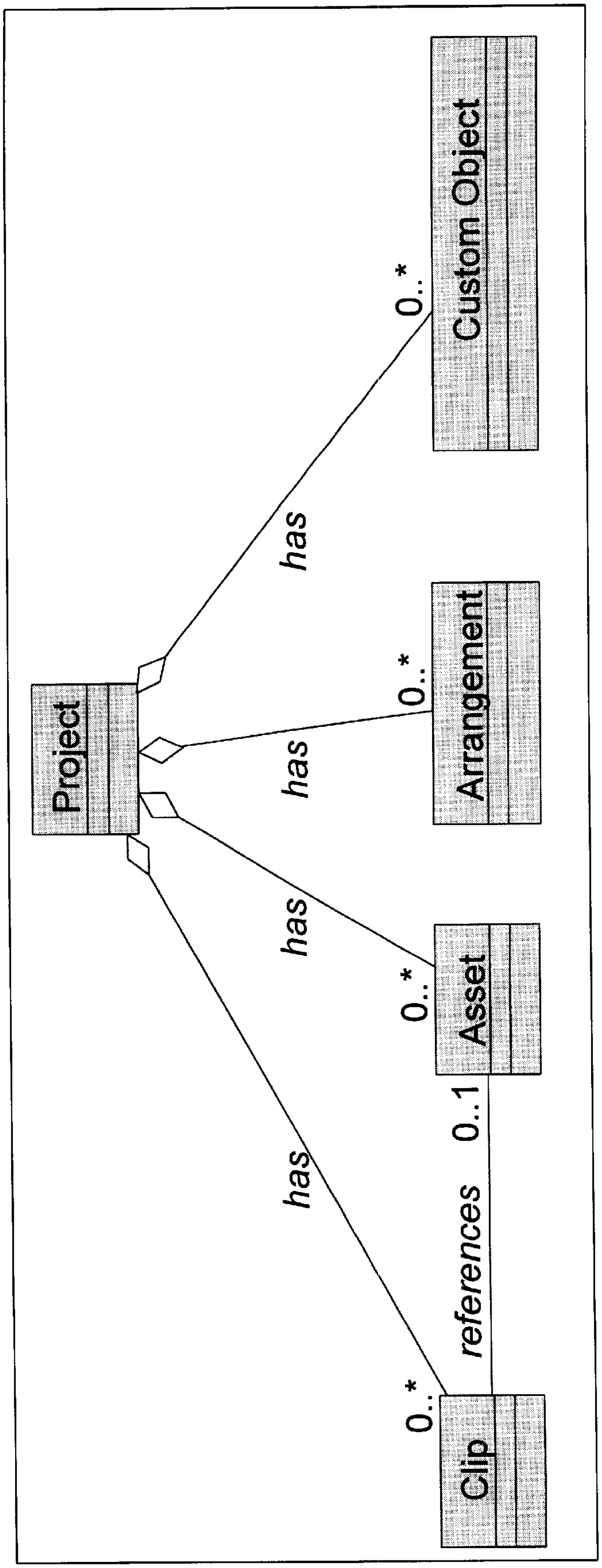
FIG. 3 is a diagram showing the hierarchical relationship of broadcast data units of the system of FIG. 1.

FIG. 3 shows the high level containment hierarchy for objects constituting broadcast data units in the preferred embodiment. Each broadcast object provides a set of interfaces to manipulate the object's attributes and perform operations on the object. Copies of all broadcast objects are held by services component 24.

Broadcast objects are created in one of two ways:

Creating objects locally and broadcasting them to server 12. Client application component 20 creates broadcast objects locally by calling Create methods on other objects in the hierarchy.

Receiving a new broadcast object from server 12. When a broadcast object is broadcast to server 12, it is added to a Project Database on the server and rebroadcast to all remote sequence stations connected to the project.

Services component 24 uses a notification system of notification queue handler 34 to communicate with client application component 20. Notifications allow services component 24 to tell the client application about changes in the states of broadcast objects.

Client application 20 is often in a state in which the data it is using should not be changed. For example, if a sequencer application is in the middle of playing back a sequence of data from a file, it may be important that it finish playback before the data is changed. In order to ensure that this does not happen, notification queue handler 34 of services component 24 only sends notifications in response to a request by client application component 20, allowing client application component 20 to handle the notification when it is safe or convenient to do so.

At the top of the broadcast object model of data packaging module 28 is Project, FIG. 3. A Project object is the root of the broadcast object model and provides the primary context for collaboration, containing all objects that must be globally accessed from within the project. The Project object can be thought of as containing sets or "pools" of objects that act as compositional elements within the project object. The Arrangement object is the highest level compositional element in the Object Model.

Figure 4:
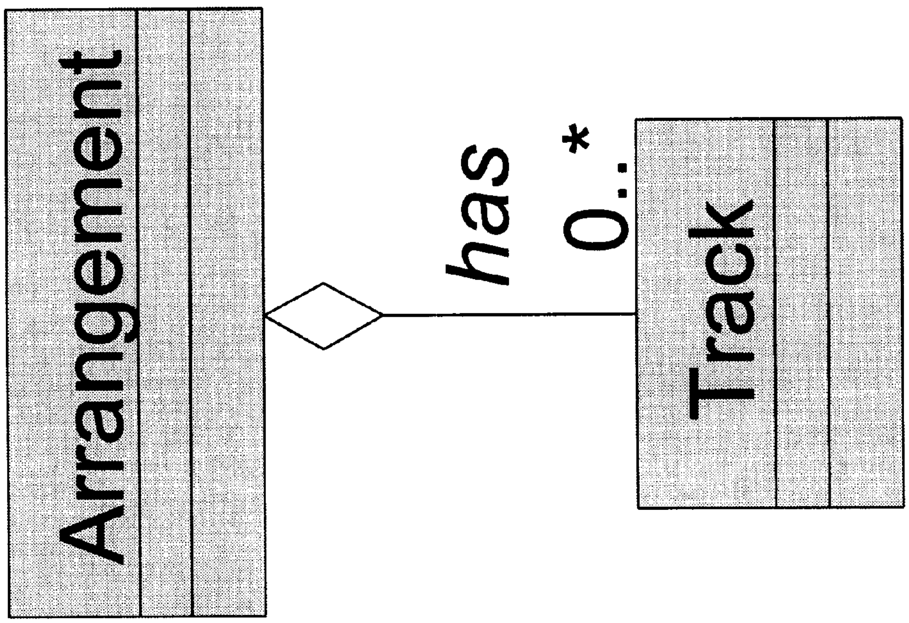
FIG. 4 is a diagram showing the relationship between Arrangement objects and Track objects of the system of FIG. 1.

As shown in FIG. 4, an Arrangement object is a collection of Track objects. This grouping of track objects serves two purposes:

1. It allows the Arrangement to define the compositional context of the tracks.
2. It allows the Arrangement to set the time context for these tracks.

Figure 5:
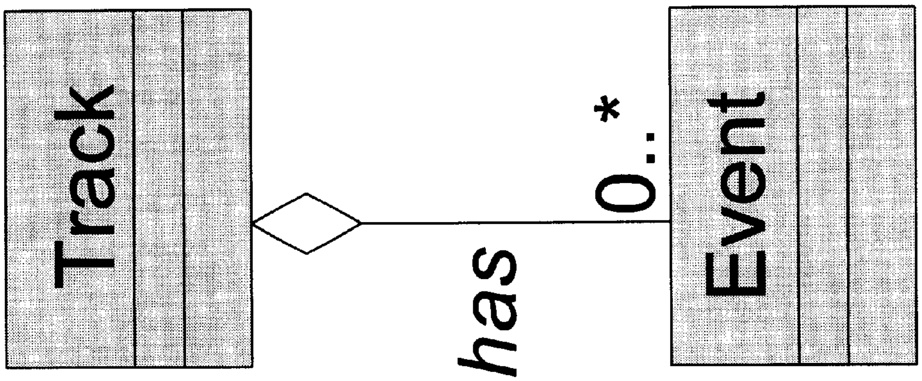
FIG. 5 is a diagram showing the relationship between Track objects and Event objects of the system of FIG. 1.

Track objects, FIG. 5, are the highest level containers for Event objects, setting their time context. All Event objects in a Track object start at a time relative to the beginning of a track object. Track objects are also the most commonly used units of ownership in a collaborative setting. Data packaging module 28 thus encapsulates the sequence data into broadcast data units, or objects, including an arrangement object establishing a time reference, and at least one track object having a track time reference corresponding to the arrangement time reference. Each Track object has at least one associated event object representing an audiovisual occurrence at a specified time with respect to the associated track time reference.

Figure 6:
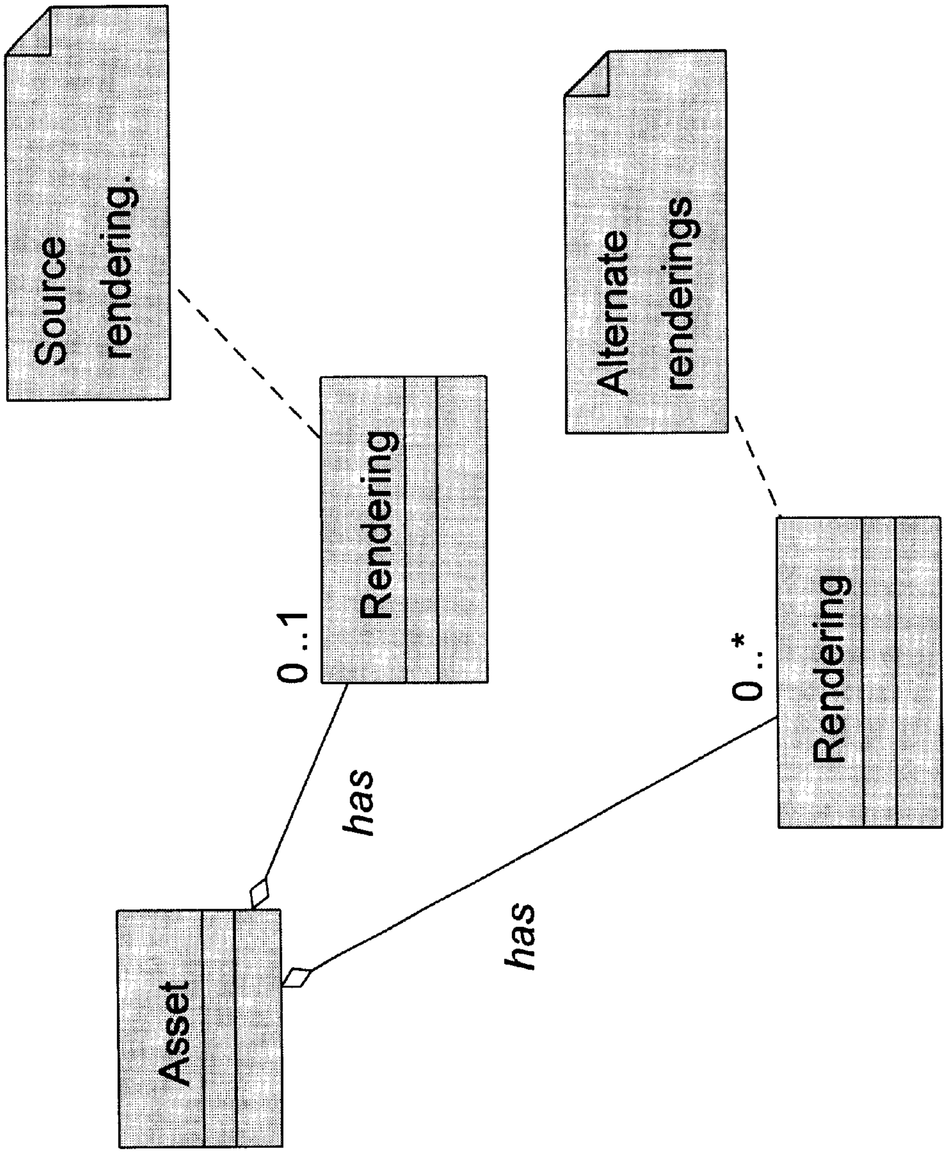
FIG. 6 is a diagram showing the relationship between Asset objects and Rendering objects of the system of FIG. 1.

The sequence data produced by client application component 20 of local sequencer station 14 includes multimedia data source data units derived from recorded data. Typically this recorded data will be MIDI data, digital audio data, or digital video data, though any type of data can be recorded and stored. These multimedia data source data units used in the Project are represented by a type of broadcast data units known as Asset objects. As FIG. 6 shows, an Asset object has an associated set of Rendering objects. Asset objects use these Rendering objects to represent different "views" of a particular piece of media, thus Asset and Rendering objects are designated as media broadcast data units. All broadcast data units other than Asset and Rendering objects are of a type designated as non-media broadcast data units.

Each Asset object has a special Rendering object that represents the original source recording of the data. Because digital media data is often very large, this original source data may never be distributed across the network. Instead, compressed versions of the data will be sent. These compressed versions are represented as alternate Rendering objects of the Asset object.

By defining high-level methods for setting and manipulating these Rendering objects, Asset objects provide a means of managing various versions of source data, grouping them as a common compositional element. Data packaging module 28 thus encapsulates the multimedia source objects into at least one type of asset rendering broadcast object, each asset rendering object type specifying a version of multimedia data source data exhibiting a different degree of data compression.

Figure 7:
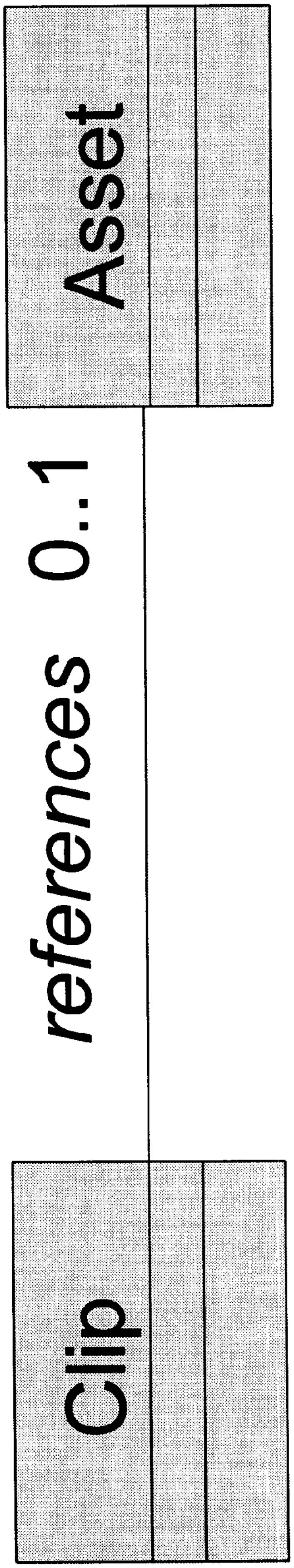
FIG. 7 is a diagram showing the relationship between Clip objects and Asset objects of the system of FIG. 1.

The sequence data units produced by client application component 20 of local sequencer station 14 include clip data units each representing a specified portion of a multimedia data source data unit. Data packaging module 28 encapsulates these sequence data units as Clip objects, which are used to reference a section of an Asset object, as shown in FIG. 7. The primary purpose of the Clip object is to define the portions of the Asset object that are compositionally relevant. For example, an Asset object representing a drum part could be twenty bars long. A Clip object could be used to reference four-bar sections of the original recording. These Clip objects could then be used as loops or to rearrange the drum part.

Figure 8:
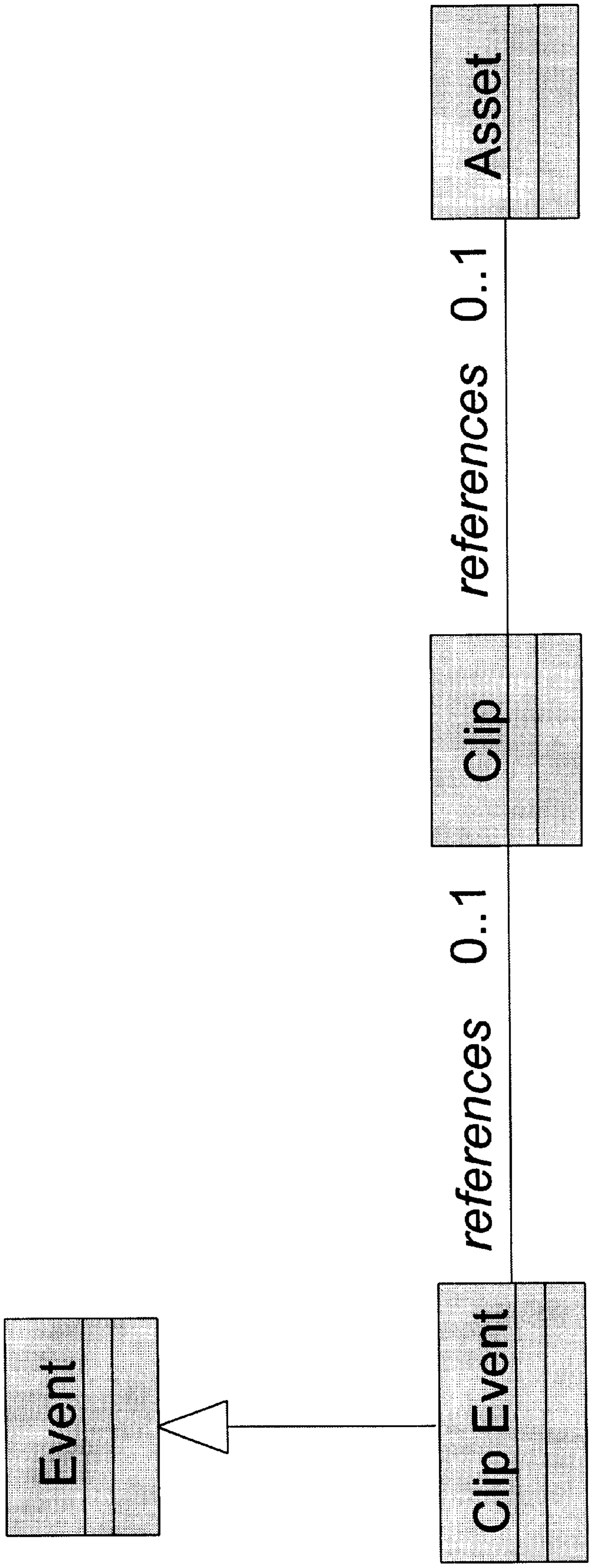
FIG. 8 is a diagram showing the relationship between Event objects, Clip Event objects, Clip objects, and Asset objects of the system of FIG. 1.

Clip objects are incorporated into arrangement objects using Clip Event objects. As shown in FIG. 8, a Clip Event object is a type of event object that is used to reference a Clip object. That is, data packaging module 28 encapsulates sequence data units into broadcast data units known as Clip Event objects each representing a specified portion of a multimedia data source data unit beginning at a specified time with respect to an associated track time reference.

At first glance, having two levels of indirection to Asset objects may seem to be overly complicated. The need for it is simple, however: compositions are often built by reusing common elements. These elements typically relate to an Asset object, but do not use the entire recorded data of the Asset object. Thus, it is Clip objects that identify the portions of Asset objects that are actually of interest within the composition.

Though there are many applications that could successfully operate using only Arrangement, Track, and Clip Event objects, many types of client application components also require that compositional elements be nested.

For example, a drum part could be arranged via a collection of tracks in which each track represents an individual drum (i.e., snare, bass drum, and cymbal). Though a composer may build up a drum part using these individual drum tracks, he thinks of the whole drum part as a single compositional element and will—after he is done editing—manipulate the complete drum arrangement as a single part. Many client application components create folders for these tracks, a nested part that can then be edited and arranged as a single unit.

Figure 9:
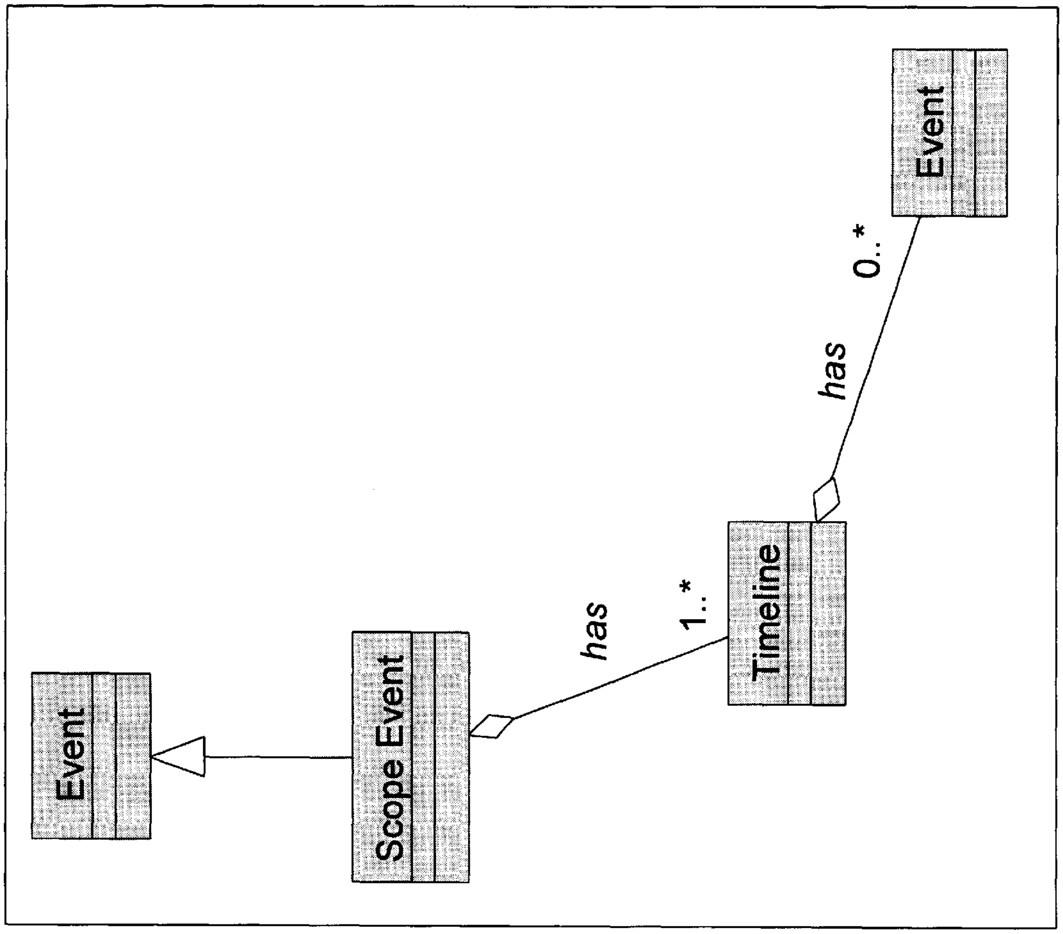
FIG. 9 is a diagram showing the relationship between Event objects, Scope Event objects, and Timeline objects of the system of FIG. 1.

In order to allow this nesting, the broadcast object hierarchy of data packaging module 28 has a special kind of Event object called a Scope Event object, FIG. 9.

A Scope Event object is a type of Event object that contains one or more Timeline objects. These Timeline objects in turn contain further events, providing a nesting mechanism. Scope Event objects are thus very similar to Arrangement objects: the Scope Event object sets the start time (the time context) for all of the Timeline objects it contains.

Timeline objects are very similar to Track objects, so that Event objects that these Timeline objects contain are all relative to the start time of the Scope Event object. Thus, data packaging module 28 encapsulates sequence data units into Scope Event data objects each having a Scope Event time reference established at a specific time with respect to an associated track time reference. Each Scope Event object includes at least one Timeline Event object, each Timeline Event object having a Timeline Event time reference established at a specific time with respect to the associated scope event time reference and including at least one Event object representing an audiovisual occurrence at a specified time with respect to the associated timeline event time reference.

Figure 10:
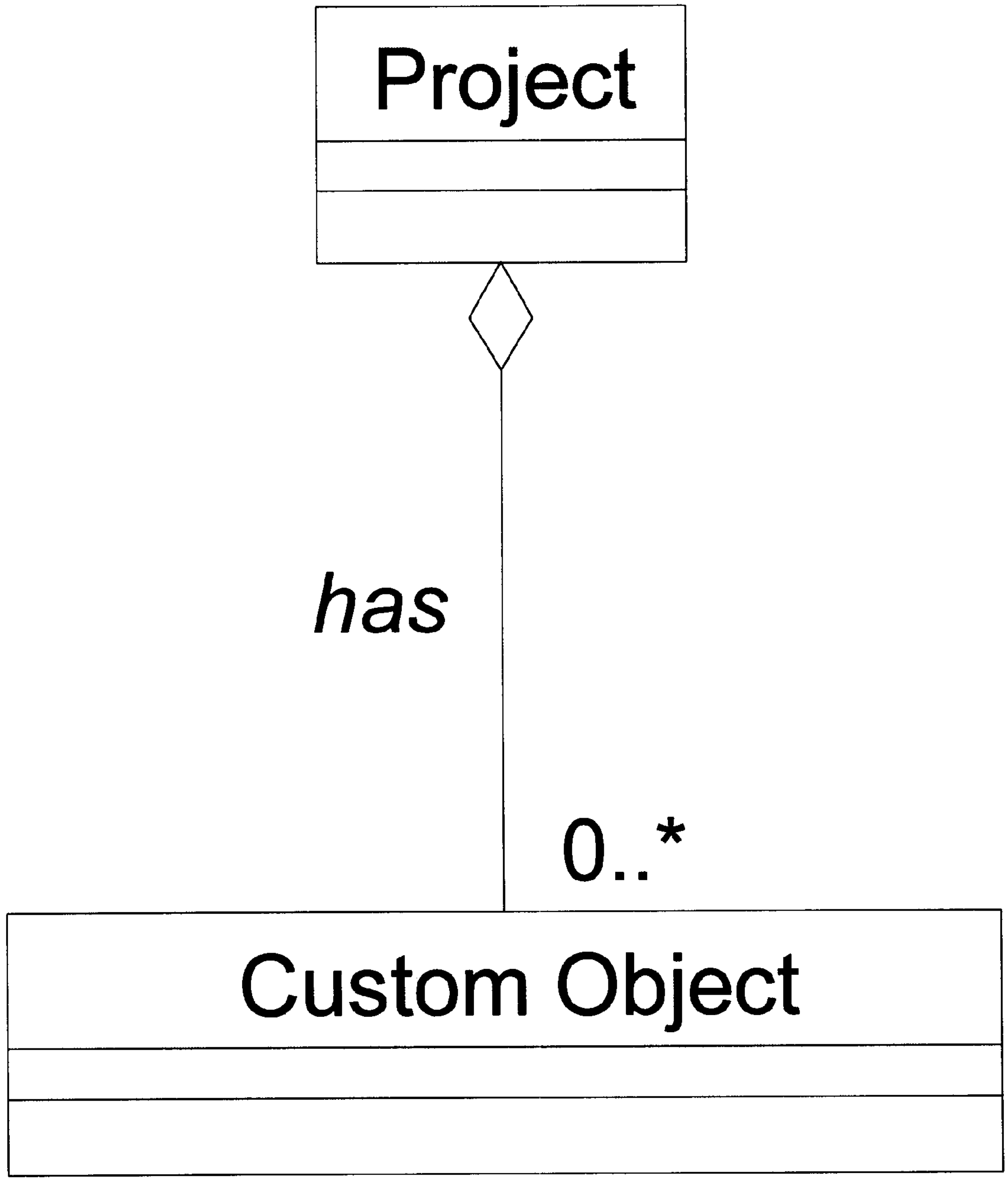
FIG. 10 is a diagram showing the relationship of Project objects and Custom objects of the system of FIG. 1.

A Project object contains zero or more Custom Objects, FIG. 10. Custom Objects provide a mechanism for containing any generic data that client application component 20 might want to use. Custom Objects are managed by the Project object and can be referenced any number of times by other broadcast objects.

Figure 11:
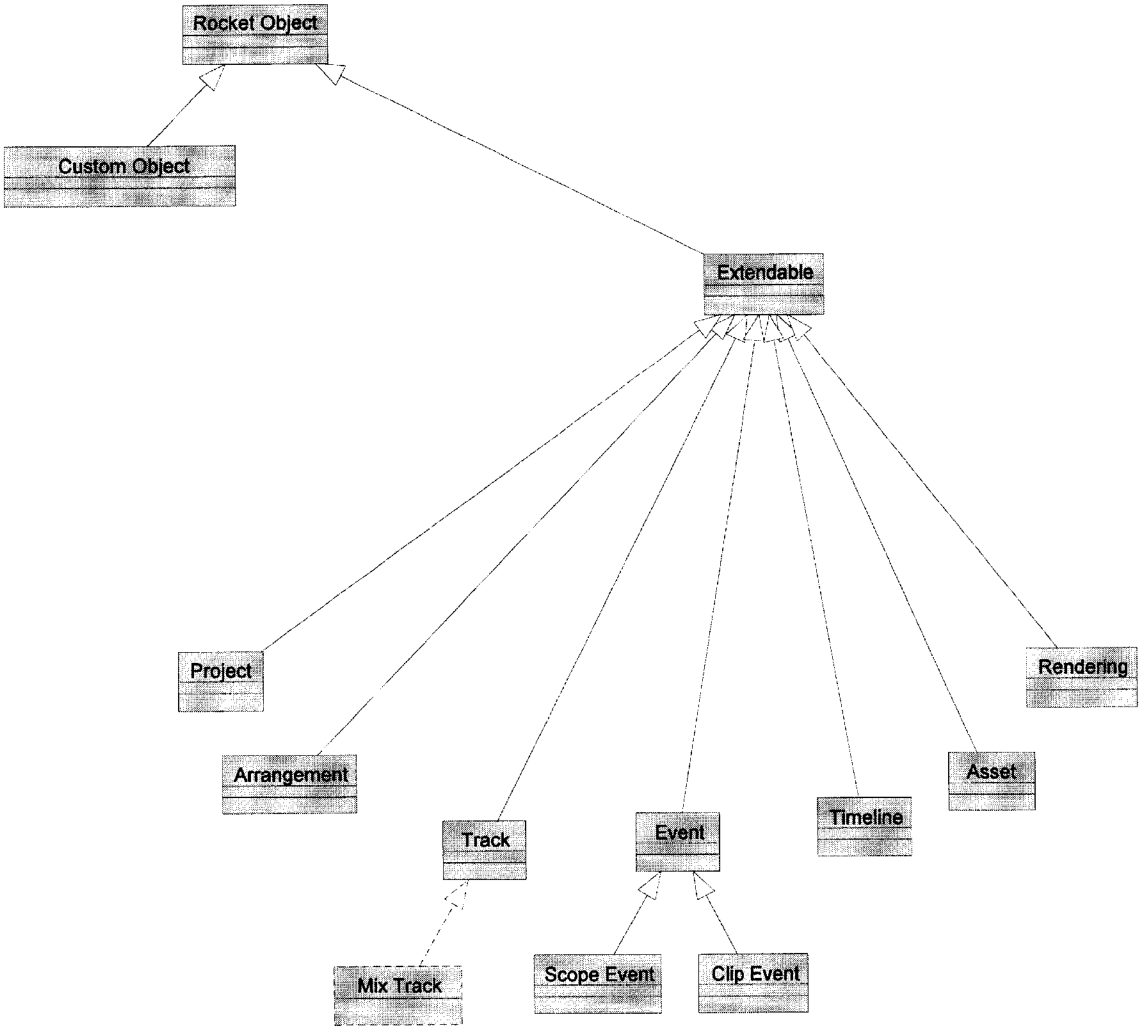
FIG. 11 is a diagram showing the relationship between Rocket objects, and Custom and Extendable objects of the system of FIG. 1.

The broadcast object model implemented by data packaging module 28 contains two special objects: rocket object and extendable. All broadcast objects derive from these classes, as shown in FIG. 11.

Rocket object contains methods and attributes that are common to all objects in the hierarchy. (For example, all objects in the hierarchy have a Name attribute.)

Extendable objects are objects that can be extended by client application component 20. As shown in FIG. 11, these objects constitute standard broadcast data units which express the hierarchy of sequence data, including Project, Arrangement, Track, Event, Timeline, Asset, and Rendering objects. The extendable nature of these standard broadcast data units allows $3^{rd}$ party developers to create specialized types of broadcast data units for their own use. For example, client application component 20 could allow data packaging module 28 to implement a specialized object called a MixTrack object, which includes all attributes of a standard Track object and also includes additional attributes. Client application component 20 establishes the MixTrack object by extending the Track object via the Track class.

As stated above, Extendable broadcast data units can be extended to support specialized data types. Many client application components 20 will, however, be using common data types to build compositions. Music sequencer applications, for example, will almost always be using Digital Audio and MIDI data types.

Connection control component 22 offers the user access to communication and navigation services within the virtual studio environment. Specifically, connection control component 22 responds to commands received from the user at local sequencer station 14 to establish access via 12 server to a predetermined subset of broadcast data units stored on server 12. Connection control component 22 contains these major modules:

1. A log-in dialog.
2. A pass-through interface to an external web browser providing access to the resource server 12.
3. A floating chat interface.
4. A private chat interface.
5. Audio compression codec preferences.
6. An interface for client specific user preferences.

The log-in dialog permits the user to either create a new account at server 12 or log-in to various virtual studios maintained on server 12 by entering a previously registered user name and password. Connection control component 22 connects the user to server 12 and establishes a web browser connection.

Once a connection is established, the user can search through available virtual studios on server 12, specify a studio to "enter," and exchange chat messages with other users from remote sequence stations 16 through a chat window.

In particular, connection control component 22 passes commands to services component 24 which exchanges messages with server 12 via server communication module 32. Preferably, chat messages are implemented via a Multi User Domain, Object Oriented (MOO) protocol.

Server communication module 32 receives data from other modules of services component 24 for transmission to server 12 and also receives data from server 12 for processing by client application component 20 and connection control component 22. This communication is in the form of messages to support transactions, that is, batches of messages sent to and from server 12 to achieve a specific function. The functions performed by server communication module 32 include downloading a single object, downloading an object and its children, downloading media data, uploading broadcasted data unit to server 12, logging in to server 12 to select a studio, logging in to server 12 to access data, and locating a studio.

These functions are achieved by a plurality of message types, described below.

ACK
: This is a single acknowledgement of receipt.

NACK
: This message is a no-acknowledge and includes an error code.

Request single object
: This message identifies the studio, identifies the project containing the object, and identifies the class of the object.

Request object and children
: This message identifies the studio, identifies the project containing the object, identifies object whose child objects and self is to be downloaded, and identifies the class of object.

Broadcast Start
: This message identifies the studio and identifies the project being broadcast.

Broadcast Create
: This message identifies the studio, identifies the project containing the object, identifies the object being created, and contains the object's data.

Broadcast Update
: This message identifies the studio, identifies the project containing the object, identifies the object being updated, identifies the class of object being updated, and contains the object's data.

Broadcast Delete
: This message identifies the studio, identifies the project containing the object, identifies the object being deleted, and identifies the class of object being updated.

Broadcast Finish
: This message identifies the studio, and identifies the project being broadcast.

Cancel transaction
: This message cancels the current transaction.

Start object download
: This message identifies the object being downloaded in this message, identifies the class of object, identifies the parent of the object, and contains the object's data.

Single object downloaded
: This message identifies the object being downloaded, identifies the class of the object, and contains the object data.

Request media download
: This message identifies the studio, identifies the project containing the object, identifies the rendering object associated with the media to be downloaded, and identifies the class of object (always Rendering).

Broadcast Media
: This message identifies the studio, identifies the project containing the object, identifies the Media object to be uploaded, identifies the class of object (always Media), identifies the Media's Rendering parent object, and contains Media data.

Media Download

This message identifies the rendering object associated with the media to be downloaded, identifies the class of object (always Rendering), and contains the media data.

Request Timestamp

This message requests a timestamp.

Response Timestamp

This message contains a timestamp in the format YYYYMMDDHHMMSSMMM (Year, Month, Day of Month, Hour, Minute, Second, Milliseconds).

Request Login

This message identifies the name of user attempting to Login and provides an MD5 digest for security.

Response SSS Login

This message indicates if a user has a registered 'Pro' version; and provides a Session token, a URL for the server Web site, a port for data server, and the address of the data server.

Request Studio Location

This message identifies the studio whose location is being requested and the community and studio names.

Response Studio Location

This message identifies the studio, the port for the MOO, and the address of the MOO.

Request single object

This message identifies the studio, identifies project containing the object, identifies object to be downloaded, and identifies the class of object.

Finish object download

This message identifies the object that has finished being downloaded, identifies the class of object, and identifies the parent of object.

Client application component 20 gains access to services component 24 through a set of interface classes defining first interface module 26 and contained in a class library. In the preferred embodiment these classes are implemented in straightforward, cross-platform C++ and require no special knowledge of COM or other inter-process communications technology.

A sequencer manufacturer integrates a client application component 20 to services component 24 by linking the class library to source code of client application component 20 in a well-known manner, using for example, visual C++ for Windows application or Metroworks Codewarrier (Pro Release 4) for Macintosh applications.

Exception handling is enabled by:

Adding Initialization and Termination entry points to client application component 20 (__initialize and__ terminate), Adding "MSL RuntimePPC++.DLL" to client application component 20, and Add "MSL AppRuntime.Lib" to client application component 20

Once these paths are specified, headers of services component 24 simply are included in source files as needed.

Any number of class libraries may be used to implement a system consistent with the present invention.

To client application component 24, the most fundamental class in the first interface module 26 is CrktServices. It provides methods for performing the following functions:

Initializing Services component 24.

Shutting down Services component 24.

Receiving Notifications from Services component 24.

Creating Project objects.

Handling the broadcast of objects to Server 12 through services component 24.

Querying for other broadcast object interfaces.

Each implementation that uses services component 24 is unique. Therefore the first step is to create a services component 24 class. To do this, a developer simply creates a new class derived from CRktServices.

```
class CMyRktServices : public CrktServices
{
public:
        CMyRktServices();
    virtual ~CMyRktServices();
    etc . . .
};
```

An application connects to Services component 24 by creating an instance of its

```
CRktServices class and calling CRktServices::Initialize():
try
{
        CMyRocketServices *pMyRocketServices = new
        CMyRocketServices;
{
pMyRocketServices->Initialize ();
}
catch( CRrktException& e)
{
// Initialize Failed
. . .
}
```

CRktServices::Initialize( ) automatically performs all operations necessary to initiate communication with services component 24 for client application component 20.

Client application component 20 disconnects from Services component 24 by deleting the CRktServices instance:

```
// If a Services component 24 Class was created, delete it
if (m__pRktServices ! = NULL)
{
    delete m__pRktServices;
    m__pRktservices = NULL;
}
```

Services component 24 will automatically download only those custom data objects that have been registered by the client application. CRktServices provides an interface for doing this:

try

```
{
    // Register for our types of custom data.
m__pRktServices->RegisterCustomDataType
( CUSTOMDATATYPEID1 );
m__pRktServices->RegisterCustomDataType
( CUSTOMDATATYPEID2 );
}
```

-continued

```
catch( CrktException& e)
{
    // Initialize Failed
. . .
}
```

Like CRktServices, all broadcast objects have corresponding CRkt interface implementation classes in first interface module 26. It is through these CRkt interface classes that broadcast objects are created and manipulated.

Broadcast objects are created in one of two ways:

Creating objects locally and broadcasting them to the Server.

Receiving a new objects from the server.

There is a three-step process to creating objects locally:

1. Client application component creates broadcast objects by calling the corresponding Create( ) methods on their container object.
2. Client application component calls CreateRktInterface( ) to get an interface to that object.
3. Client application component calls CRktServices::Broadcast( ) to update the server with these new objects.

Broadcast objects have Create( ) methods for every type of object they contain. These Create( ) methods create the broadcast object in services component 24 and return the ID of the object.

For example, CRktServices has methods for creating a Project. The following code would create a Project using this method:

```
CRktProject* pProject = NULL;
// Wrap call to RocketAPI in try-catch for possible error conditions
try
{
    // attempt to create project
    pProject =
    CMyRktServices: :Instance () ->CreateRktProjectInterface
        (
CRktServices: :Instance () ->CreateProject () );
    // user created. set default name
    pProject->SetName( "New Project" );
} // try
catch( CRktException& e )
{
    delete pProject;
    e.ReportRktError ();
    return false;
}
```

To create a Track, client application component 20 calls the CreateTrack( ) method of the Arrangement object. Each parent broadcast object has method(s) to create its specific types of child broadcast objects.

It is not necessary (nor desirable) to call CRktServices::Broadcast( ) immediately after creating new broadcast objects. Broadcasting is preferrably triggered from the user interface of client application component 20. (When the user hits a "Broadcast" button, for instance).

Because services component 24 keeps track of and manages all changed broadcast objects, client application component 20 can take advantage of the data management of services component 24 while allowing users to choose when to share their contributions and changes with other users connected to the Project.

Note that (unlike CRktServices) data model interface objects are not created directly. The must be created through the creation methods or the parent object.

Client application component 20 can get CRkt interface objects at any time. The objects are not deleted from data packaging module 28 until the Remove( ) method has successfully completed.

Client application component 20 accesses a broadcast object as follows:

```
// Get an interface to the new project and
// set name.
{
  CRktPtr < CRktProject > pMyProject =
    CMyRktServices: :Instance () ->CreateRktProjectInterface
    (Project);
  MyProject->SetName( szProjName);
} // try
catch( CRktException& e )
{
  e.ReportRktError ();
  }
```

The CRktPtr<> template class is used to declare auto-pointer objects. This is useful for declaring interface objects which are destroyed automatically, when the CRktPtr goes out of scope.

To modify the attributes of a broadcast object, client application component 20 calls the access methods defined for the attribute on the corresponding CRkt interface class:

```
// Change the name of my project
pRktObj -> SetName("My Project");
```

Each broadcast object has an associated Editor that is the only user allowed to make modifications to that object. When an object is created, the user that creates the object will become the Editor by default.

Before services component 24 modifies an object it checks to make sure that the current user is the Editor for the object. If the user does not have permission to modify the object or the object is currently being broadcast to the server, the operation will fail.

Once created, client application component 20 is responsible for deleting the interface object:

delete pTrack;

Deleting CRkt interface classes should not be confused with removing the object from the data model. To remove an object from the data model, you call the object's Removed( ) method is called:

```
pTrack -> Remove();          // remove from the data model
```

Interface objects are "reference-counted." Although calling Remove( ) will effectively remove the object from the data model, it will not de-allocate the interface to it. The code for properly removing an object from the data model is:

```
CRktTrack* pTrack;
// Create Interface . . .
pTrack -> Remove ();          // remove from the data model
delete pTrack;                // delete the interface object
```

or using the CRktPtr Template:

```
CRktPtr < CRrktTrack > pTrack;
// Create Interface . . .
pTrack -> Remove ();
// pTrack will automatically be deleted when it
// goes out of scope
```

Like the create process, objects are not deleted globally until the CRktServices::Broadcast( ) method is called.

If the user does not have permission to modify the object or a broadcast is in progress, the operation will fail, throwing an exception.

Broadcast objects are not sent and committed to Server 12 until the CRktServices::Broadcast( ) interface method is called. This allows users to make changes locally before committing them to the server and other users. The broadcast process is an asynchronous operation. This allows client application component 20 to proceed even as data is being uploaded.

To ensure that its database remains consistent during the broadcast procedure, services component 24 does not allow any objects to be modified while a broadcast is in progress. When all changed objects have been sent to the server, an OnBroadcastComplete notification will be sent to the client application.

Client application component 20 can revert any changes it has made to the object model before committing them to server 12 by calling CRktServices::Rollback( ). When this operation is called, the objects revert back to the state they were in before the last broadcast. (This operation does not apply to media data.)

Rollback( ) is a synchronous method.

Client application component 20 can cancel an in-progress broadcast by calling CrktServicea::CancelBroadcast( ). This process reverts all objects to the state they are in on the broadcasting machine. This includes all objects that were broadcast before CancelBroadcast( ) was called.

CancelBroadcast( ) is a synchronous method.

Notifications are the primary mechanism that services component 24 uses to communicate with client application component 20. When a broadcast data unit is broadcast to server 12, it is added to the Project Database on server 12 and a data available message is rebroadcast to all other sequencer stations connected to the project. Services component 24 of the other sequencer stations generate a notification for their associated client application component 20. For non-media broadcast data units, the other sequencer stations also immediately request download of the available broadcast data units; for media broadcast data units, a command from the associated client application component 20 must be received before a request for download of the available broadcast data units is generated.

Upon receipt of a new broadcast data unit, services component 24 generates a notification for client application component 20. For example, if an Asset object were received, the OnCreateAssetComplete( ) notification would be generated.

All Notifications are handled by the CrktServices instance and are implemented as virtual functions of the CRktServices object.

To handle a Notification, client application component 20 overrides the corresponding virtual function in its CRktServices class. For example:

```
class CMyRktServices : public CRktServices
{
    . . .
    // Overriding to handle OnCreateAssetComplete Notifications
    virtual void OnCreateAssetComplete {
        const RktObjectIdType&   rObjectId,
        const RktObjectIdType&   rParentObjectId;
    . . .
};
```

When client application component 20 receives notifications via notification queue handler 28, these overridden methods will be called:

```
RkNestType
CMyRktServices: :OnCreateAssetStart (
    const RktObjectIdType&
rObjectId,
    const RktObjectIdType&   rParentObjectId )
{
      try
      {
        // Add this Arrangement to My Project
          if ( m_pProjTreeView != NULL )
            m_pProjTreeView->NewAsset ( rParentObjectId-rOb-
            jectId); ) // try
          catch( CRktException& e )
      {
        e.ReportRktError ();
      }
      return ROCKET_QUEUE_DO_NEST;
}
```

Sequencers are often in states in which the data they are using should not be changed. For example, if client application component 20 is in the middle of playing back a sequence of data from a file, it may be important that it finish playback before the data is changed.

In order to ensure data integrity, all notification transmissions are requested client application component 20, allowing it to handle the notification from within its own thread. When a notification is available, a message is sent to client application component 20.

On sequencer stations using Windows, this notification comes in the form of a Window Message. In order to receive the notification, the callback window and notification message must be set. This is done using the CRktServices::SetDataNotificationHandler( ) method:

```
// Define a message for notification from Services component 24.
#define RKTMSG_NOTIFICATION_PENDING ( WM_APP + 0x100 )
                              . . .
// Now Set the window to be notified of Rocket Events CMyRktServices: :
Instance()-
>SetDataNotificationHandler (m_hWnd, ,
RKTMSG_NOTIFICATION_PENDING) ;
```

This window will then receive the RKTMSG_NOTIFICATION_PENDING message whenever there are notifications present on the event queue of queue handler module 34.

Client application component 20 would then call CRktServices::ProcessNextDataNotication( ) to instruct services component 24 to send notifications for the next pending data notification:

```
// Data available for Rocket Services. Request Notification.
afx_msg CMainFrame: :OnPendingDataNotification(LPARAM 1,
WPARAM w)
{
    CMyRktServices: :Instance () ->ProcessNextDataNotification ();
}
```

ProcessNextDataNotification( ) causes services component 24 to remove the notification from the queue and call the corresponding notification handler, which client application component 20 has overridden in its implementation of CRktServices.

On a Macintosh sequencer station, client application component 20 places a call to CrktServices::

```
DoNotifications() in their idle loop, and then override the CRktServices: :
OnDataNotificationAvailable() notification method :
// This method called when data available on the event notification
// queue.
void CMyRktServices: :OnDataNotificationAvailable ()
    try
    {
        ProcessNextDataNotification ();
    }
    catch ( CRktLogicException e )
    {
        e.ReportRktError();
    }
}
```

As described in the Windows section above, ProcessNextDataNotification( ) instructs services component 24 to remove the notification from the queue and call the corresponding notification handler which client application component 20 has overridden in its implementation of CRktServices.

Because notifications are handled only when client application component 20 requests them, notification queue handler of services component 24 uses a "smart queue" system to process pending notifications. The purpose of this is two-fold:

1. To remove redundant messages.
2. To ensure that when an object is deleted, all child object messages are removed from the queue.

This process helps ensure data integrity in the event that notifications come in before client application component 20 has processed all notifications on the queue.

The system of FIG. 1 provides the capability to select whether or not to send notifications for objects contained within other objects. If a value of ROCKET_QUEUE_DO_NEST is returned from a start notification then all notifications for objects contained by the object will be sent. If ROCKET_QUEUE_DO_NOT_NEST is returned, then no notifications will be sent for contained objects. The Create<T>Complete notification will indicate that the object and all child objects have been created.

For example if client application component 20 wanted to be sure to never receive notifications for any Events contained by Tracks, it would override the OnCreateProjectStart( ) method and have it return ROCKET_QUEUE_DO_NOT_NEST:

```
RktNestType
CMyRktServices:: OnCreateProjectStart (
    conSt RktObjectIdType& rObjectId,
    const RktObjectIdType& rParentObjectId )
// don't send me notifications for
// anything contained by this project.
        return ROCKET_QUEUE_DO_NOT_NEST;
}
```

And in the CreateTrackComplete( ), notification parse the objects contained by the track:

```
void
CMyRktservices::OnCreateProjectC
omplete (
    const RktObjectIdType&
objectId,
    const RktObjectIdType&
parentObjectId )
```

In the preferred embodiment, predefined broadcast objects are used wherever possible. By doing this, a common interchange standard is supported. Most client application components 20 will be able to make extensive use of the predefined objects in the broadcast object Model. There are times, however, when a client application component 20 will have to tailor objects to its own use.

The described system provides two primary methods for creating custom and extended objects. If client application component 20 has an object which is a variation of one of the objects in the broadcast object model, it can choose to extend the broadcast object. This permits retention of all of the attributes, methods and containment of the broadcast object, while tailoring it to a specific use. For example, if client application component 20 has a type of Track which holds Mix information, it can extend the Track Object to hold attributes which apply to the Mix Track implementation. All pre-defined broadcast object data types in the present invention (audio, MIDI, MIDI Drum, Tempo) are implemented using this extension mechanism.

The first step in extending a broadcast object is to define a globally unique RktExtendedDataIdType:

```
    // a globally unique ID to identify my extended data type
    const RktExtendedDataIdType CRocketId
    MY_EXTENDED_TRACK_ATTR_ID
        ( "14A51841-B618-11d2-BD7E-0060979C492B" );
```

This ID is used to mark the data type of the object. It allows services component 20 to know what type of data broadcast object contains. The next step is to create an attribute structure to hold the extended attribute data for the object:

```
    struct CMyTrackAttributes
    {
            CMyTrackAttributes ();
    Int32Type m_nMyQuantize;        // my extended data
    };
```

-continued

```
// Simple way to initialize defaults for your attributes is
// to use the constructor for the struct
CMyTrackAttributes: :CMyTrackAttributes ()
{
    m_nMyQuantize = kMyDefaultQuantize;
}
```

To initialize an extended object; client application component 20 sets the data type Id, the data size, and the data:

```
// set my attributes . . .
CMyTrackAttributes    myTrackAttributes;
myTrackAttributes.m_nMyQuantize = 16;
try
{
    // Set the extended data type
    pTrack->SetDataType( MY_EXTENDED_TRACK_ATTR_ID ) ;
    // Set the data (and length)
    Int32Type nSize = sizeof(myTrackAttributes);
Track->SetData ( &myTrackAttributes, &nSize);
}
catch ( CRktException e )
{
    e.ReportRktError();
}
```

When a notification is received for an object of the extended type, it is assumed to have been initialized. Client application component 20 simply requests the attribute structure from the CRkt interface and use its values as necessary.

```
// Check the data type, to see if we understand it.
RktExtendedDataIdType dataType =
pTrack->GetDataType (        );
// if this is a MIDI track . . .
if ( dataType == CLSID_ROCKET_MIDI_TRACK_ATTR )
{
    // Create a Midi struct
    CMyTrackAttributes myTrackAttributes;
    // Get the Data. Upon return, nSize is set to the actual
// size of the data.
    Int32Type nSize = sizeof ( CMyTrackAttributes );
    pTrack->GetData -( &myTrackAttributes, nSize );
    // Access struct members . . .
    DoSomethingWith( myTrackAttributes );
    }
```

Custom Objects are used to create proprietary objects which do not directly map to objects in the broadcast object model of data packaging module 28. A Custom Data Object is a broadcast object which holds arbitrary binary data. Custom Data Objects also have attributes which specify the type of data contained by the object so that applications can identify the Data object. Services component 24 does provide all of the normal services associated with broadcast objects—Creation, Deletion, Modification methods and Notifications—for Custom Data Descriptors.

The first step to creating a new type of Custom Data is to create a unique ID that signifies the data type (or class) of the object:

```
// a globally unique ID to identify my custom data object
const RktCustomDataIdType My_CUSTOM_OBJECT_ID
("FEB24F40-B616-11d2-BD7E-0060979C492B") ;
```

This ID must be guaranteed to be unique, as this ID is used to determine the type of data being sent when Custom Data notifications are received. The next step is thus to define a structure to hold the attributes and data for the custom data object.

```
    struct CMyCustomDataBlock
{
    CMyCustomDataBlock ();
    int m_nMyCustomAttribute;
};
```

CrktProject::CreateCustomObject( ) can be called to create a new custom object, set the data type of the Data Descriptor object, and set the attribute structure on the object:

```
try
{
    // To create a Custom Data Object:
    // First, ask the Project to create a new Custom Data Object
    RktObjectIdType myCustomObjectId =
    pProject->CreateCustomObject (          );
    // Get an interface to it
    CRktPtr< CRktCustomObject > pCustomObject =
       m_MyRocketServices->CreateRktCustomObjectInterface
          ( myCustomObjectId );
    // Create my custom data block and fill it in . . .
    CMyCustomDataBlock myCustomData;
    . . .
    // Set the Custom data type
    pCustomObject->SetDataType( MY_CUSTOM_OBJECT_ID );
    // Attach the extended data to the object (set data and size)
    Int32Type nSize = sizeof( CMyCustomDataBlock );
    pCustomObject->SetData( &myCustomData, nSize );
} // try
catch ( CRktException e )
{
            e.ReportRktError ();
}
```

When client application component 20 receives the notification for the object, it simply checks the data type and handles it as necessary:

```
// To access an existing Custom Data Object:
try
    // Assume we start with the ID of the object . . .
    // Get an interface to it
    CRktPtr< CRktCustomObject >
    pCustomObject =
       m_pMyRocketServices->CreateRktCustomObjectInterface
          {
                myCustomObjectId );
    // Check the data type, to see if we understand it. Shouldn't
    // be necessary, since we only register for ones we understand,
    // but we'll be safe
```

-continued

```
    RktCustomDataIdType idCustom;
    idCustom =
};
    if ( idCustom == CLSID_MY_CUSTOM_DATA )
    {
        // Create my custom data struct
        CMyCustomDataBlock myCustom:Data;
        // Get the Data. Upon return, theSize is set to the actual
        // size of the data.
        Int32Type, nSize = sizeof ( myCustomData );
        pCustomObject->GetData( &myCustomData, nSize );
        // Access struct members . . .
        DoSomethingWith( myCustomData );
    } // if my custom data
} // try
catch ( CRktException& e )
{
    e.ReportRktError ();
}
```

All of the custom data types must be registered with services component 24 (during services component 24 initialization). Services component 24 will only allow creation and reception of custom objects which have been registered. Once registered, the data will be downloaded automatically.

```
// Tell Services component 24 to send me these data types
pMyRocketServices->RegisterCustomDataType
(My_CUSTOM_OBJECT_ID);
```

When a user is building a musical composition, he or she arranges clips of data that reference recorded media. This recorded media is represented by an Asset object in the broadcast object model of data packaging component 32. An Asset object is intended to represent a recorded compositional element. It is these Asset objects that are referenced by clips to form arrangements.

Though each Asset object represents a single element, there can be several versions of the actual recorded media for the object. This allows users to create various versions of the Asset. Internal to the Asset, each of these versions is represented by a Rendering object.

Asset data is often very large and it is highly desirable for users to broadcast compressed versions of Asset data. Because this compressed data will often be degraded versions of the original recording, an Asset cannot simply replace the original media data with the compressed data.

Asset objects provide a mechanism for tracking each version of the data and associating them with the original source data, as well as specifying which version(s) to broadcast to server 12. This is accomplished via Rendering objects.

Each Asset object has a list of one or more Rendering objects, as shown in FIG. 6. For each Asset object, there is a Source Rendering object, that represents the original, bit-accurate data. Alternate Rendering objects are derived from this original source data.

The data for each rendering object is only broadcast to server 12 when specified by client application component 20. Likewise, rendering object data is only downloaded from server 12 when requested by client application component 20.

Each rendering object thus acts as a placeholder for all potential versions of an Asset object that the user can get, describing all attributes of the rendered data. Applications select which Rendering objects on server 12 to download the data for, based on the ratio of quality to data size.

Rendering Objects act as File Locator Objects in the broadcast object model. In a sense, Assets are abstract elements; it is Rendering Objects that actually hold the data.

Renderings have two methods for storing data:

In RAM as a data block.

On disk as a File.

The use of RAM or disk is largely based on the size and type of the data being stored. Typically, for instance, MIDI data is RAM-based, and audio data is file-based.

Of all objects in the broadcast object model, only Rendering objects are cached by cache module 36. Because Rendering objects are sent from server 12 on a request-only basis, services component 24 can check whether the Rendering object is stored on disk of local sequencer station 14 before sending the data request.

In the preferred embodiment, Asset Renderings objects are limited to three specific types:

Source: Specifies the original source recording—Literally represents a bit-accurate recreation of the originally recorded file.

Standard: Specifies the standard rendering of the file to use, generally a moderate compressed version of the original source data.

Preview: Specifies the rendering that should be downloaded in order to get a preview of the media, generally a highly compressed version of the original source data.

Each of the high-level Asset calls uses a flag specifying which of the three Rendering object types is being referenced by the call. Typically the type of Rendering object selected will be based on the type of data contained by the Asset. Simple data types—such as MIDI—will not use compression or alternative renderings. More complex data types—such as Audio or Video—use a number of different rendering objects to facilitate efficient use of bandwidth.

A first example of use of asset objects will be described using MIDI data. Because the amount of data is relatively small, only the source rendering object is broadcast, with no compression and no alternative rendering types.

The sender creates a new Asset object, sets its data, and broadcasts it to server 12.

Step 1: Create an Asset Object

The first step for client application component 20 is to create an Asset object. This is done in the normal manner:

```
// Attempt to Create an Asset in the current Project
RktObjectIdType assetId = pProject -> CreateAsset();
```

Step 2: Set the Asset Data and Data Kind

The next step is to set the data and data kind for the object. In this case, because the amount of data that we are sending is small, only the source data is set:

```
// Set the data for my midi data
pMidiAeset -> SetDataKind ( DATAKIND_ROCKET_MIDI );
// Set the Midi Data
pMidiAsset -> SetSourceMedia ( pMIDIData, nMIDIDataSize
};
```

The SetSourceMedia( ) call is used to set the data on the Source rendering. The data kind of the data is set to DATAKIND_ROCKET_MIDI to signify that the data is in standard MIDI file format.

Step 3: Set the Asset Flags

The third step is to set the flags for the Asset. These flags specify which rendering of the asset to upload to the server 12 the next time a call to Broadcast( ) is made. In this case, only the source data is required.

```
// Always Broadcast MIDI
Source
pMidiAsset -> SetBroadcastFlags {
ASSET_BROADCAST_SOURCE );
```

Setting the ASSET_BROADCAST_SOURCE flag specifies that the source rendering must be uploaded for the object.

Step 4: Broadcast

The last step is to broadcast. This is done as normal, in response to a command generated by the user:

```
pMyRocketServices-
>Broadcast() ;
```

To receive an Asset, client application component 20 of local sequence station 14 handles the new Asset notification and requests the asset data. When the OnCreateAssetComplete notification is received, the Asset object has been created by data packaging module 28. Client application component 20 creates an interface to the Asset object and queries its attributes and available renderings:

```
virtual void
CMyRocketServices: :OnCreateAssetComplete (
    const RktObjectIdType&   rObjectId,
const RktObjectIdType&   rParentObjectId )
{
    try
        {
        // Get an interface to the new asset
        CRktPtr < CRktAsset > pAsset =
        CreateRkAssetInterface ( rObjectId );
        // Check what kind of asset it is
        DataKindType dataKind = pAsset->GetDataKind();
        // See if it is a MIDI asset
        if ( dataKind == CLSID_ROCKET_MIDI_ASSET )
    {
        // Create one of my application's MIDI asset equiv
    // etc . . .
    }
    else if ( dataKind == CLSID_ROCKET_AUDIO_ASSET )
    {
        // Create one of my application's Audio asset equiv
        // etc . . .
      }
    }
    catch ( CRktException &e )
{
        e.ReportRktError();
}
```

Data must always be requested by local sequencer station 12 for assets. This allows for flexibility when receiving large amounts of data. To do this client application component 20 simply initiates the download:

```
virtual void
CMyRktServices: :OnAssetMediaAvailable (
const RktObjectIdType&   rAssetId,
const RendClassType      classification,
const RktObjectIdType&   rRenderingId
{
    try
    {
        CRktPtr < CRktAsset > pAsset =
            CreateRktAssetInterface ( rAssetId );
    // Check if the media already exists on this machine.
    // If not, download it. (Note: this isn't necessarily
    // recommended - you should download media whenever
    // it is appropriate. Your UI might even allow downloading
    // of assets on an individual basis).
    // Source is always Decompressed.
    // Other renderings download compressed.
    RendStateType rendState;
    if ( classification == ASSET_SOURCE_REND_CLASS )
        rendState = ASSET_DECOMPRESSED_REND_STATE;
        else
        rendState = ASSET_COMPRESSED_REND_STATE;
        // If the media is not already local, then download it
        if ( ! pAsset->IsMediaLocal ( classification, rendState ) )
    {
        // Note: If this media is RAM-based, the file locator
        // is ignored.
    CRktFileLocator fileLocUnused;
      pAsset->DownloadMedia
        ( classification, fileLocUnused );
          }
}
catch ( CRktException &e )
{
    e.ReportRktError ();
}
```

When the data has been successfully downloaded, the OnAssetMediaDownloaded( ) Notification will be sent. At this point the data is available locally, and client application component 20 calls GetData( ) to get a copy of the data:

```
    // This notification called when data has been downloaded
    virtual void
    CMyRktServices: :OnAssetMediaDownloaded (
            const RktObjectIdType&   rAssetId,
        const RendClassType          classification,
        const RktObjectIdType&   rRenderingId const
            try
              {
        // Find my corresponding object
        CRktPtr < CRktAsset > pAsset =
          CreateRktAssetInterface ( rAssetId );
        // Have services component 24 allocate a RAM based
        // copy, and store a pointer to the data in pData
        // store its size in nSize.
        // Note: this application will be responsible for
        // freeing the memory
        void* pData;
        long        nSize;
        pAsset->GetMediaCopy {
          ASSET_SOURCE_REND_CLASS,
          ASSET_DECOMPRESSED_REND_STATE,
          &pData,
          nsize );
    }
        catch ( CRktException &e )
        {
        e.ReportRktError ();
        }
```

In a second example, an audio data Asset is created. Client application component 20 sets the audio data and a compressed preview rendering is generated automatically by services component 24.

In this scenario the data size is quite large, so the data is stored in a file.

The sender follows many of the steps in the simple MIDI case above. This time, however, the data is stored in a file and a different broadcast flag used:

```
// Ask the project to create a new asset
RktObjectIdType assetId = pProject->CreateAsset();
// Get an interface to the new asset
CRktPtr < CRktAsset > pAsset =
   CRktServices: :Instance ()->CreateRktAssetInterface
      ( assetId );
// Set the data kind
pAsset->SetDataKind( DATAKIND__ROCKET__AUDIO );
// Set the source rendering file.
// We don't want to upload this one yet. Just the preview
CRktFileLocator fileLocator;
// Set the fileLocator here (bring up a dialog or use a
// pathname. Or use an FSSpec on).
pAsset->SetSourceMedia( & fileLocator-);
// Set the flags so that only a preview is uploaded.
// We did not generate the preview rendering ourselves,
// so we will need to call
// CRktServices: :RenderforBroadcast() before calling
// Broadcast(). This will generate any not-previously
// created renderings which are specified to be broadcast.
pAsset->SetBroadcastFlags (
ASSET__BROADCAST__PREVIEW );
// Make sure all renderings are created
pMyRocketServices->RenderForBroadcast ();
// and Broadcast
pMyRocketServices->Broadcast ();
```

Because ASSET__BROADCAST__PREVIEW was specified, services component 24 will automatically generate the preview rendering from the specified source rendering and flag it for upload when CRocketServices::RenderForBroadcast( ) is called.

Alternatively, the preview could be generated by calling CRkAsset::CompressMedia( ) explicitly:

```
      // compress the asset (true means synchronous)
      pAsset−>CompressMedia(
      ASSET__PREVIEW__REND__CLASS, ,
true);
```

In this example ASSET__BROADCAST__SOURCE was not set. This means that the Source Rendering has not been tagged for upload and will not be uploaded to server 12.

The source rendering could be added to uploaded later by calling:

```
pAsset−>SetBroadcastFlags
(ASSET__BROADCAST__SOURCE
|ASSET__BROADCAST__PREVIEW);
pMyRocketServices−>Broadcast();
```

When an Asset is created and broadcast by a remote sequencer station 16, notification queue handler 28 generates an OnCreateAssetComplete( ) notification. Client application component then queries for the Asset object, generally via a lookup by ID within its own data model:

```
// find matching asset in my data model.
CMyAsset-* pMyAsset = FindMyAsset (idAsset);
```

As above, the data would be requested:

```
   CRktFileLocator locDownloadDir;
   // On Windows . . .
   locDownloadDir.SetPath( "d:\\MyDownloads\\" );
   // (similarly on Mac, but would probably use an FSSpec)
   pAsset->DownloadMedia( ASSET__PREVIEW REND__CLASS,
&locDownloadDir );
```

The CRktAsset::DownloadMedia( ) specifies the classification of the rendering data to download and the directory to which the downloaded file should be written.

When the data has been successfully downloaded, the OnAssetMediaDownloaded notification will be sent. At this point the compressed data is available, but it needs to be decompressed:

```
   // this notification called when data has been downloaded virtual void
   CMyRocketServices: :OnAssetMediaDownloaded (
      const RktObjectIdType& rAssetId,
   const RendClassType      classification,
   const RktObjectIdType& rRenderingId
   {
      try
   {
               // Get an interface to the asset
            CRktPtr < CRktAsset > pAsset =
         CreateRktAssetInterface ( rAssetId );
      // and get set the data for the asset.
      pAsset->DecompressRendering( classification, false );
   }
   catch ( CRktException &e )
   {
      e.ReportRktError ();
   }
```

When the data has been successfully decompressed, the OnAssetDataDecompressed( ) notification will be sent:

```
// This notification called when data decompression complete virtual void
CMyRktServices: :OnAssetMediaDecompressed (
   const RktObjectIdType& rAssetId,
   const RendClassType   classification,
   const RktObjectIdType& rRenderingId )
{
   try
{
     CreateRktAssetInterface   ( rAssetId );
// Get the Audio data for this asset to a file.
CRktFileLocator locDecompressedFile =
pMyAsset->GetMedia
  (classification,
ASSET__DECOMPRESSED__REND__STATE );
// Now import the file specified by locDecompressedFile
```

-continued

```
// -into Application. . .
catch ( CRktException &e )
}
{
e. ReportRktError ();
}
*/
```

Services component 24 keeps track of what files it has written to disk client application component 20 can then check these files to determine what files need to be downloaded during a data request Files that are already available need not be downloaded. Calls to IsMediaLocal( ) indicate if media has been downloaded already.

Services component 24 uses Data Locator files to track and cache data for Rendering objects. Each data locator file is identified by the ID of the rendering it corresponds to, the time of the last modification of the rendering, and a prefix indicating whether the cached data is preprocessed (compressed) or post-processed (decompressed ).

For file-based rendering objects, files are written in locations specified by the client application. This allows media files to be grouped in directories by project. It also means that client application component 20 can use whatever file organization scheme it chooses.

Each project object has a corresponding folder in the cache directory. Like Data Locators, the directories are named with the ID of the project they correspond to. Data Locator objects are stored within the folder of the project that contains them.

Because media files can take up quite a lot of disk space, it is important that unused files get cleared. This is particularly true when a higher quality file supercedes the current rendering file. For example, a user may work for a while with the preview version of an Asset, then later choose to download the source rendering. At this point the preview rendering is redundant. CRkt-Asset provides a method for clearing this redundant data:

```
// Clear up the media we are no longer using.
    pAsset->DeleteLocalMedia
        ASSET_PREVIEW_REND_CLASS, ,
ASSET_COMPRESSED_REND_STATE);
pAsset->DeleteLocalMedia
(ASSET_PREVIEW_REND_CLASS, ,
ASSET_DECOMPRESSED_REND_STATE);
```

This call both clears the rendering file from the cache and deletes the file from disk or RAM.

It will be apparent to those skilled in the art that various modifications and variations can be made in the methods and systems consistent with the present invention without departing from the spirit or scope of the invention. For example, if all of the constants in the invention described above were multiplied by the same constant, the result would be a scaled version of the present invention and would be functionally equivalent. The true scope of the claims is defined by the following claims.

What is claimed is:

1. Apparatus for sharing sequence data associated with a collaborative project between a local sequencer station and at least one remote sequencer station over a network via a server, the sequence data representing audiovisual occurrences each having descriptive characteristics and time characteristics, the apparatus comprising:

a first interface module receiving commands from an associated client application operating on the local sequencer station and capable of modifying the audiovisual occurrences;

a data packaging module coupled to the first interface module, the data packaging module responding to the received commands by encapsulating sequence data associated with the collaborative project from the local sequencer station into broadcast data units retaining the descriptive characteristics and time relationships of the sequence data, the data packaging module also extracting sequence data associated with the collaborative project from broadcast data units received from the server for access by the local sequencer station;

a broadcast handler coupled to the first interface module and the data packaging module, the broadcast handler processing commands received via the first interface module;

a server communications module responding to commands processed by the broadcast handler by transmitting broadcast data units to the server for distribution to at least one remote sequencer station, the server communications module also receiving data available messages associated with the collaborative project and broadcast data units transmitted from the server; and a notification queue handler coupled to the server communications module and responsive to receipt of data available messages associated with the collaborative project and broadcast data units transmitted from the server to transmit notifications to the client application via the first interface, the notifications indicating availability of broadcast data units for access by the local sequencer station.

2. Apparatus as recited in claim 1, wherein the data packaging module encapsulates the sequence data into broadcast data units including an arrangement data unit establishing a time reference, and at least one track data unit having a track time reference corresponding to the arrangement time reference, each track data unit having at least one associated event data unit representing an audiovisual occurrence at a specified time with respect to the associated track time reference.

3. Apparatus as recited in claim 2, wherein the sequence data produced by the local sequencer station includes multimedia data source data units and wherein the data packaging module encapsulates the multimedia source data units into at least one type of asset rendering broadcast unit, each asset rendering broadcast unit type specifying a version of multimedia data source data exhibiting a different degree of data compression.

4. Apparatus as recited in claim 3, wherein the server communications module responds to commands processed by the broadcast handler by transmitting asset rendering broadcast units of a selected asset rendering broadcast unit type to the server for distribution to at least one remote sequencer station.

5. Apparatus as recited in claim 3, wherein the sequence data units produced by the local sequencer station include clip data units each representing a specified portion of a multimedia data source data unit and wherein the data packaging module encapsulates the clip data units into broadcast clip data units.

6. Apparatus as recited in claim 5, wherein the data packaging module encapsulates sequence data units into broadcast clip event data units each representing a specified portion of a multimedia data source data unit beginning at a specified time with respect to an associated track time reference.

7. Apparatus as recited in claim 6, wherein:

the data packaging module encapsulates sequence data units into scope event data units each having a scope event time reference established at a specific time with respect to an associated track time reference;

each scope event data unit including at least one timeline event data unit, each timeline event data unit having a timeline event time reference established at a specific time with respect to the associated scope event time reference and including at least one event data unit representing an audiovisual occurrence at a specified time with respect to the associated timeline event time reference.

8. Apparatus as recited in claim 1, comprising a connection control component responsive to commands received from the local sequencer station to establish access via the server to a predetermined subset of broadcast data units stored on the server.

9. Apparatus as recited in claim 8, wherein the connection control component receives registration data from the local sequencer station and establishes access to a predetermined subset of broadcast data units stored on the server in accordance with permission data stored on the server.

10. Apparatus as recited in claim 1, wherein the data packaging module:

encapsulates sequence data into first and second types of broadcast data units;

responds to receipt of a message indicating the availability at the server of the first type of broadcast data unit by causing the server communications module to initiate a download of the first type of broadcast data unit without requiring authorization from the client application component; and responds to receipt of a message indicating the availability at the server of the second type of broadcast data unit by causing the server communications module to initiate a download of the second type of broadcast data unit only after receipt of a download command from the client application component.

11. Apparatus as recited in claim 10, wherein the first type of broadcast data unit comprises a non-media broadcast data unit and the second type of broadcast data unit comprises a media broadcast data unit.

12. Apparatus for sharing sequence data associated with a collaborative project between a local sequencer station and at least one remote sequencer station over a network via a server, the sequence data representing audiovisual occurrences each having descriptive characteristics and time characteristics and including multimedia data source data units, the apparatus comprising:

a first interface module receiving commands from an associated client application operating on the local sequencer station and capable of modifying the audiovisual occurrences;

a data packaging module coupled to the first interface module, the data packaging module responding to the received commands by encapsulating sequence data associated with the collaborative project from the local sequencer station into broadcast data units retaining the descriptive characteristics and time relationships of the sequence data, the data packaging module encapsulating the multimedia data source data units into at least one type of asset rendering broadcast unit, each rendering broadcast unit type specifying a version of multimedia data source data units exhibiting a different degree of data compression, the data packaging module also extracting sequence data associated with the collaborative project from broadcast data units received from the server;

a broadcast handler coupled to the first interface module and the data packaging module, the broadcast handler processing command received via the first interface module; and a server communications module responding to commands processed by the broadcast handler by transmitting broadcast data units to the server for distribution to at least one remote sequencer station, the server communications module also receiving broadcast data units via the server from the at least one remote sequencer station.

13. Apparatus for sharing sequence data associated with a collaborative project between a local sequencer station and at least one remote sequencer station over a network via a server, the sequence data representing audiovisual occurrences each having descriptive characteristics and time characteristics, the apparatus comprising:

a first interface module receiving commands from an associated client application operating on the local sequencer station and capable of modifying the audiovisual occurrences;

a data packaging module coupled to the first interface module, the data packaging module responding to the received commands by encapsulating sequence data associated with the collaborative project from the local sequencer station into broadcast data units retaining the descriptive characteristics and time relationships of the sequence data, the broadcast data units including custom broadcast data units, standard broadcast data units expressing a hierarchy of sequence data, and specialized broadcast data units including all attributes of standard broadcast data units plus additional attributes, the data packaging module also extracting sequence data associated with the collaborative project from broadcast data units received from the server;

a broadcast handler coupled to the first interface module and the data packaging module, the broadcast handler processing commands received via the first interface module; and a server communications module responding to commands processed by the broadcast handler by transmitting broadcast data units to the server for distribution to at least one remote sequencer station, the server communications module also receiving broadcast data units via the server from the at least one remote sequencer station and passing the received broadcast data units to the data packaging module.

14. A method for sharing sequence data associated with a project between a local sequencer station and at least one remote sequencer station over a network via a server, the sequence data representing audiovisual occurrences each having descriptive characteristics and time characteristics, the method comprising:

receiving commands from a user at the local sequencer station via a client application component capable of modifying the audiovisual occurrences;

responding to the received commands by encapsulating sequence data associated with the collaborative project from the local sequencer station into broadcast data units retaining the descriptive characteristics and time relationships of the sequence data and transmitting broadcast data units to the server for distribution to at least one remote sequencer station;

receiving data available messages associated with the collaborative project transmitted from the server;

responding to receipt of data available messages associated with the collaborative project transmitted from the server to transmit notifications to the client application component, the notifications indicating availability of broadcast data units for access by the client application component;

responding to commands received from the client application component to request download of broadcast data units from the server; and receiving broadcast data units from the server and extracting sequence data associated with the collaborative project from the received broadcast data units for access by the client application component.

15. Apparatus as recited in claim 1, wherein the server communications module caches broadcast data units.

16. Apparatus as recited in claim 1, wherein the sequence data includes at least one rendered version of sequence data.

17. Apparatus as recited in claim 16, wherein the rendered version of sequence data includes a compressed version of sequence data.

18. Apparatus as recited in claim 1, wherein the network includes a local area network (LAN).

19. A computer-readable medium storing instructions which, if executed by a computer system, cause the computer system to implement a method for sharing sequence data associated with a collaborative project between a local sequencer station and at least one remote sequencer station over a network via a server, the sequence data representing audiovisual occurrences each having descriptive characteristics and time characteristics, the method comprising:

receiving commands from a user at the local sequencer station via a client application component capable of modifying the audiovisual occurrences;

responding to the received commands by encapsulating sequence data associated with the collaborative project from the local sequencer station into broadcast data units retaining the descriptive characteristics and time relationships of the sequence data and transmitting broadcast data units to the server for distribution to at least one remote sequencer station;

receiving data available messages associated with the collaborative project transmitted from the server;

responding to receipt of data available messages transmitted from the server to transmit notifications to the client application component, the notifications indicating availability of broadcast data units for access by the client application component;

responding to commands received from the client application component to request download of broadcast data units from the server; and receiving broadcast data units from the server and extracting sequence data associated with the collaborative project from the received broadcast data units for access by the client application component.

20. Apparatus for sending sequence data associated with a collaborative project to a server and accessing sequence data associated with the collaborative project stored on the server by a local sequencer station connected to the server over a network, the sequence data representing audiovisual occurrences each having descriptive characteristics and time characteristics, the apparatus comprising:

a first interface module receiving commands from an associated client application operating on the local sequencer station and capable of modifying the audiovisual occurrences;

a data packaging module coupled to the first interface module, the data packaging module responding to the received commands by encapsulating sequence data associated with the collaborative project from the local sequencer station into broadcast data units retaining the descriptive characteristics and time relationships of the sequence data, the data packaging module also extracting sequence data associated with the collaborative project from broadcast data units received from the server for access by the local sequencer station;

a broadcast handler coupled to the first interface module and the data packaging module, the broadcast handler processing commands received via the first interface module;

a server communications module responding to commands processed by the broadcast handler by transmitting broadcast data units to the server, the server communications module also receiving data available messages associated with the collaborative project and broadcast data units transmitted from the server; and a notification queue handler coupled to the server communications module and responsive to receipt of data available messages associated with the collaborative project and broadcast data units transmitted from the server to transmit notifications to the client application component via the first interface, the notifications indicating availability of broadcast data units for access by the local sequencer station.

21. Apparatus as recited in claim 20, further comprising a caching module caching broadcast data units.

22. Apparatus as recited in claim 20, further comprising a rendering module rendering sequence data into at least one rendered version of sequence data.

23. Apparatus as recited in claim 22, wherein the rendered version of sequence data includes a compressed version of sequence data.

24. Apparatus as recited in claim 20, wherein the data packaging module encapsulates the sequence data into broadcast data units including an arrangement data unit establishing a time reference.

25. Apparatus as recited in claim 24, wherein the broadcast data units further include at least one track data unit having a track time reference corresponding to the arrangement time reference, each track data unit having at least one associated event data unit representing an audiovisual occurrence at a specified time with respect to the associated track time reference.

26. Apparatus as recited in claim 20, wherein the sequence data produced by the local sequencer station includes multimedia data source data units and wherein the data packaging module encapsulates the multimedia source data units into at least one type of asset rendering broadcast unit, each asset rendering broadcast unit type specifying a version of multimedia data source data exhibiting a different degree of data compression.

27. Apparatus as recited in claim 26, wherein the server communications module responds to commands processed by the broadcast handler by transmitting asset rendering broadcast units of a selected asset rendering broadcast unit type to the server.

28. Apparatus as recited in claim 26, wherein the sequence data units produced by the local sequencer station include clip data units each representing a specified portion of a multimedia data source data unit and wherein the data packaging module encapsulates the clip data units into broadcast clip data units.

29. Apparatus as recited in claim 28, wherein the data packaging module encapsulates sequence data units into broadcast clip event data units each representing a specified portion of a multimedia data source data unit beginning at a specified time with respect to an associated track time reference.

30. Apparatus as recited in claim 29, wherein:

the data packaging module encapsulates sequence data units into scope event data units each having a scope event time reference established at a specific time with respect to an associated track time reference; and each scope event data unit including at least one timeline event data unit, each timeline event data unit having a timeline event time reference established at a specific time with respect to the associated scope event time reference and including at least one event data unit representing an audiovisual occurrence at a specified time with respect to the associated timeline event time reference.

31. Apparatus as recited in claim 20, comprising a connection control component responsive to commands received from the local sequencer station to establish access via the server to a predetermined subset of broadcast data units stored on the server.

32. Apparatus as recited in claim 31, wherein the connection control component receives registration data from the local sequencer station and establishes access to a predetermined subset of broadcast data units stored on the server in accordance with permission data stored on the server.

33. Apparatus as recited in claim 20, wherein the data packaging module:

encapsulates sequence data into first and second types of broadcast data units;

responds to receipt of a message indicating the availability at the server of the first type of broadcast data unit by causing the server communications module to initiate a download of the first type of broadcast data unit based on a download command from the client application; and responds to receipt of a message indicating the availability at the server of the second type of broadcast data unit by causing the server communications module to initiate a download of the second type of broadcast data unit upon authorization from the client application.

34. Apparatus as recited in claim 33, wherein the first type of broadcast data unit comprises a non-media broadcast data unit and the second type of broadcast data unit comprises a media broadcast data unit.

35. Apparatus as recited in claim 20, wherein the network includes a local area network (LAN).

36. A computer-readable medium storing instructions which, if executed by a computer system, cause the computer system to implement a method for sending sequence data associated with the collaborative project to a server and accessing sequence data associated with the collaborative project stored on the server by a local sequencer station connected to the server over a network, the sequence data representing audiovisual occurrences each having descriptive characteristics and time characteristics, the method comprising:

receiving commands from a user at the local sequencer station via a client application component capable of modifying the audiovisual occurrences;

responding to the received commands by encapsulating sequence data associated with the collaborative project from the local sequencer station into broadcast data units retaining the descriptive characteristics and time relationships of the sequence data and transmitting broadcast data units to the server for distribution to at least one remote sequencer station;

receiving data available messages associated with the collaborative project transmitted from the server;

responding to receipt of data available messages transmitted from the server to transmit notifications to the client application component, the notifications indicating availability of broadcast data units for access by the client application component;

responding to commands received from the client application component to request download of broadcast data units from the server; and receiving broadcast data units from the server and extracting sequence data associated with the collaborative project from the received broadcast data units for access by the client application component.

* * * * *